United States Patent [19]

McCurry et al.

[11] Patent Number: 5,019,717

[45] Date of Patent: May 28, 1991

[54] COMPUTER-CONTROLLED UNINTERRUPTABLE POWER SUPPLY

[75] Inventors: Patrick W. McCurry, Keizer; James R. Kellogg, Medford; Karl Boekelheide, Tigard; Kenneth D. Sexton; George A. Ellson, both of Salem; Robert A. Hocker, Molalla, all of Oreg.

[73] Assignee: Elegant Design Solutions Inc., Salem, Oreg.

[21] Appl. No.: 270,715

[22] Filed: Nov. 14, 1988

[51] Int. Cl.$^5$ .......................................... H02M 3/335
[52] U.S. Cl. ........................................ 307/66; 307/81; 307/86; 363/65; 363/89; 323/267
[58] Field of Search ..................... 363/19–21, 363/24–26, 65, 89, 97; 323/282, 284, 285, 267, 354; 307/48, 64–66, 80–81, 85–86; 364/431.11

[56] References Cited

U.S. PATENT DOCUMENTS

| | | | |
|---|---|---|---|
| 4,034,232 | 7/1977 | LaVenture | 323/267 |
| 4,327,298 | 4/1982 | Burgin | 307/66 |
| 4,549,131 | 10/1985 | Kusazaki | 323/354 |
| 4,580,220 | 4/1986 | Braun et al. | 364/431.11 |
| 4,665,501 | 5/1987 | Saldin et al. | 364/518 |
| 4,672,228 | 6/1987 | Swoboda | 307/66 |
| 4,673,825 | 6/1987 | Raddi et al. | 307/66 |
| 4,677,366 | 6/1987 | Wilkinson et al. | 363/21 |

OTHER PUBLICATIONS

Arnold Hagiwara, Powertechnics Magazine (Apr. 1988), "The Benefits of Active Power Factor Correction", pp. 35–38.

Primary Examiner—Peter S. Wong
Attorney, Agent, or Firm—Rosen, Jacobs & Jacobs

[57] ABSTRACT

A computer-controlled, uninterruptable power supply system is disclosed. The system selectively operates from more than one input source of power, e.g., an AC input, an external DC input and internal batteries. The system is of the type which utilizes one or more switch mode converters and is especially suited for use in computer systems. The system monitors a number of functions under computer control and reacts automatically to the monitored functions to follow a programmed course of action. During start up, the system monitors prescribed functions and prevents power turn-on upon detection of prescribed faults. The system may communicate with a host computer, provide data thereto, and receive down-loaded parameters therefrom. Such down-loaded parameters may be used by the system to control operation of the system. The system determines the condition of internal batteries so that when operating from the batteries, the system is cognizant of how long it or a host may continue operating, and then reacts accordingly. The system includes at least one fan and a number of sensors which sense temperature at a number of locations in the system, and is capable of controlling fan operation and locating faults based on sensed parameters. The system comprises a watchdog circuit to monitor computer operation. The watchdog circuit and the computer periodically self test operation of the watch dog circuit. The system determines current drain by means of a current sense resistance which is a trace on a circuit board, and the system itself calibrates the sense resistance.

40 Claims, 13 Drawing Sheets

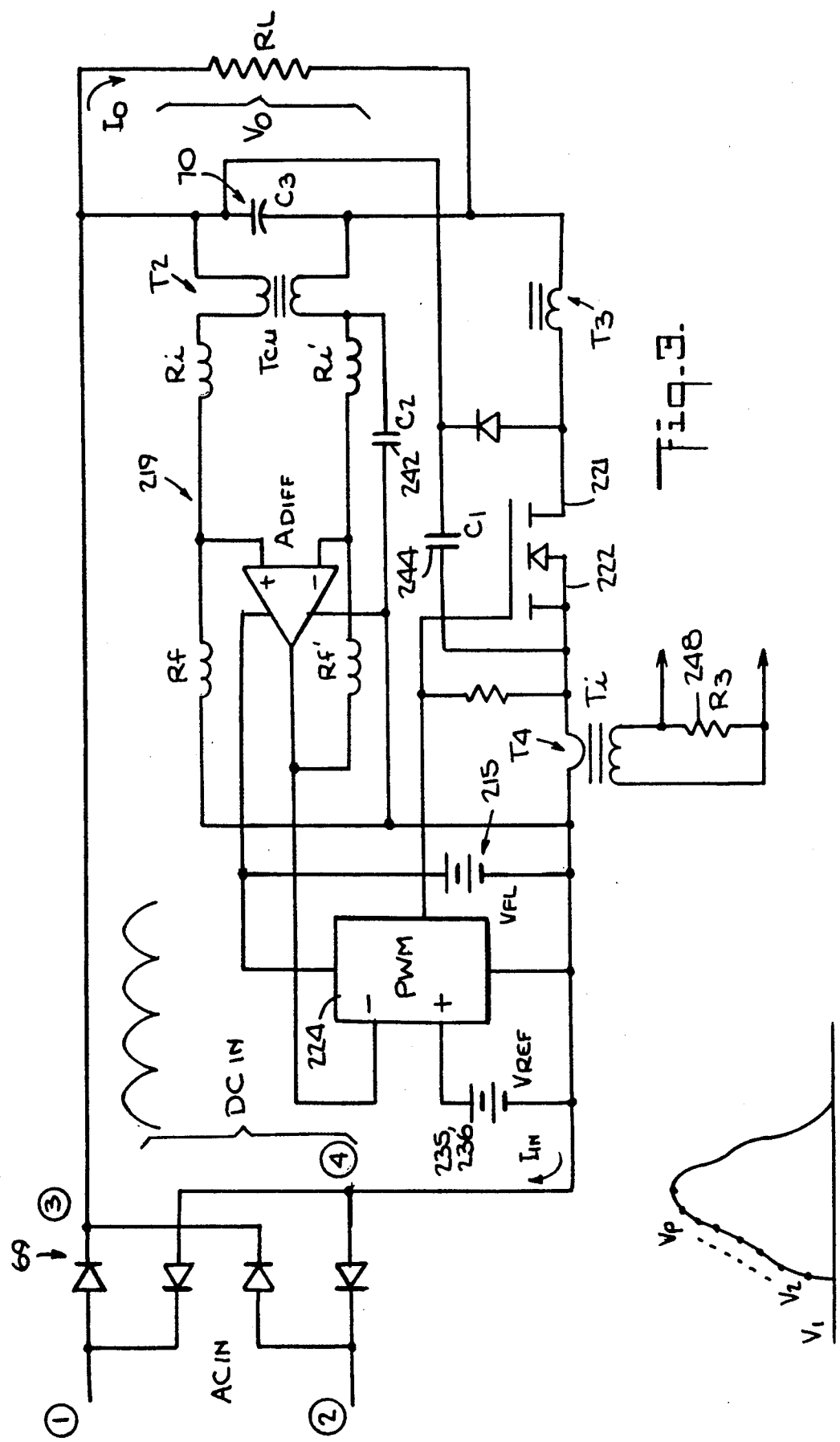

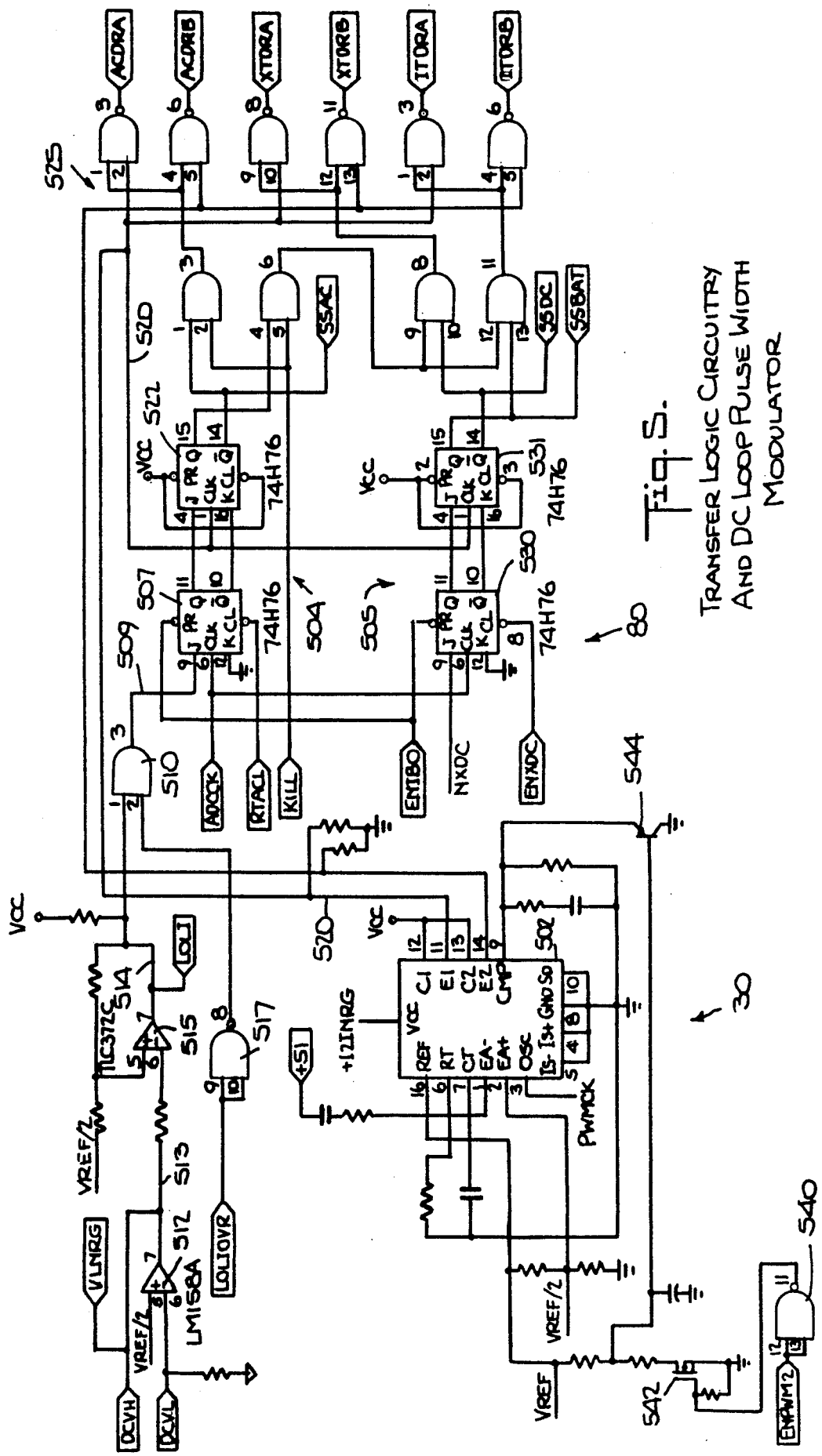

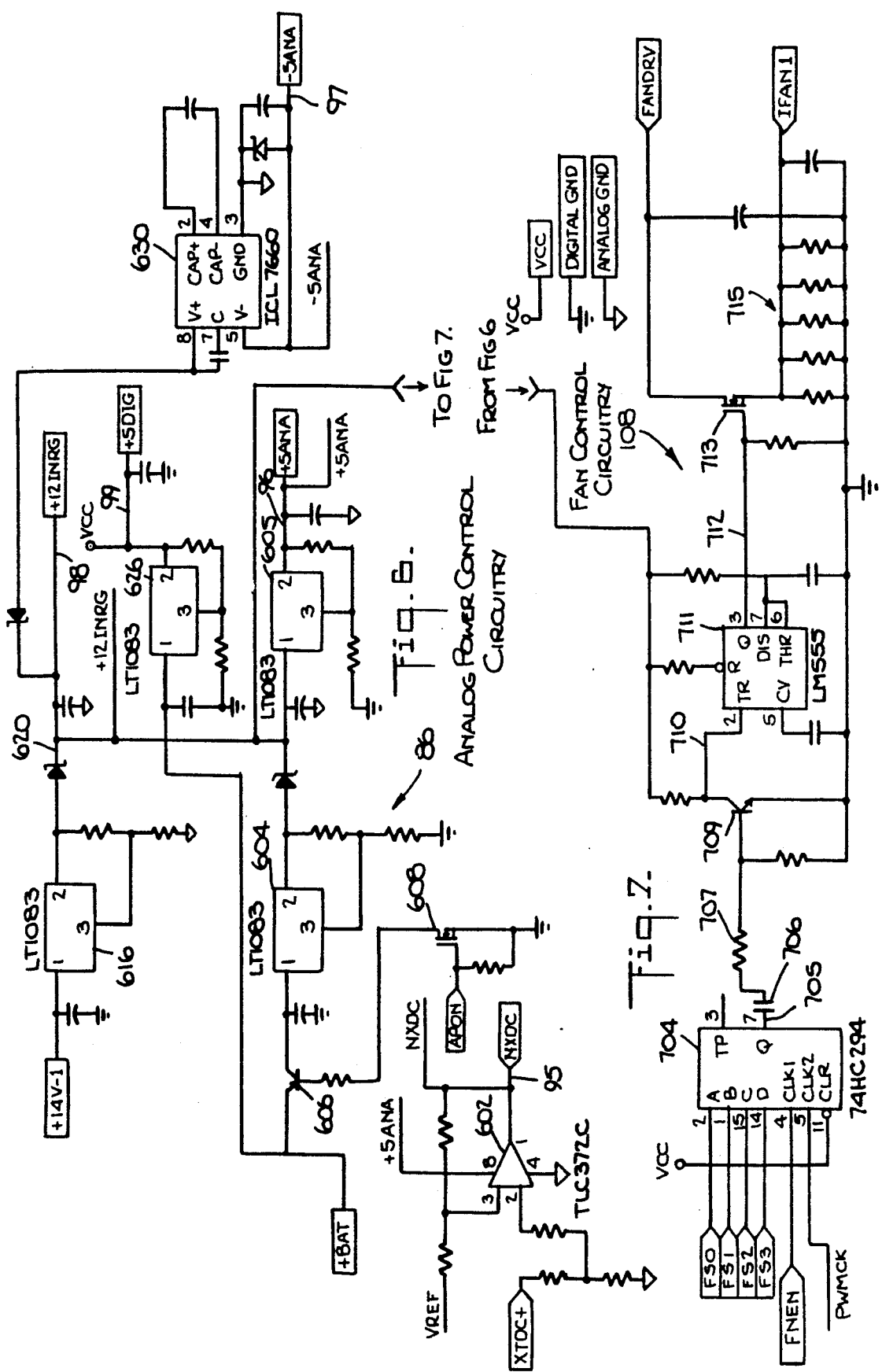

CHARGING CIRCUIT CONTROL

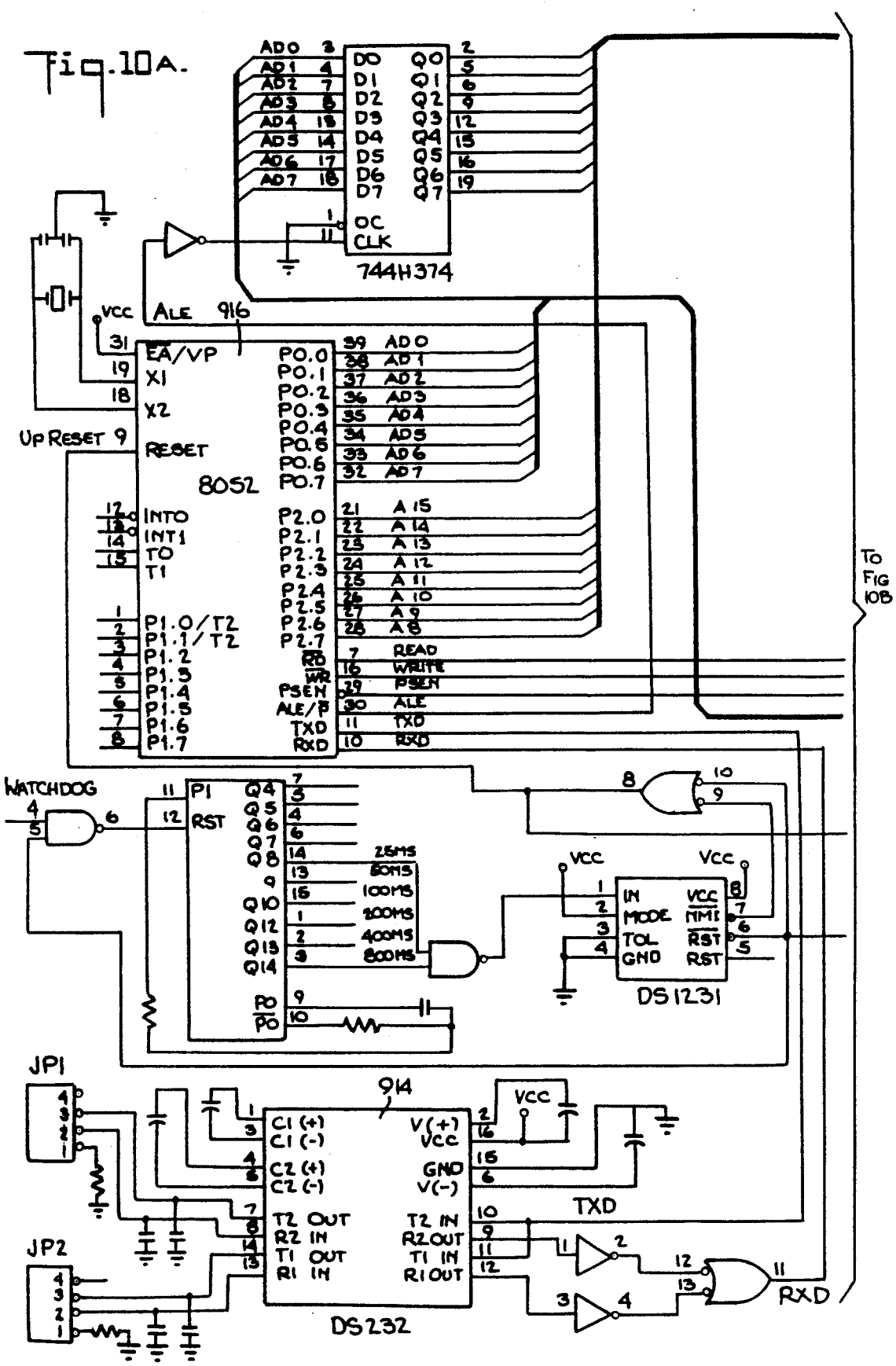

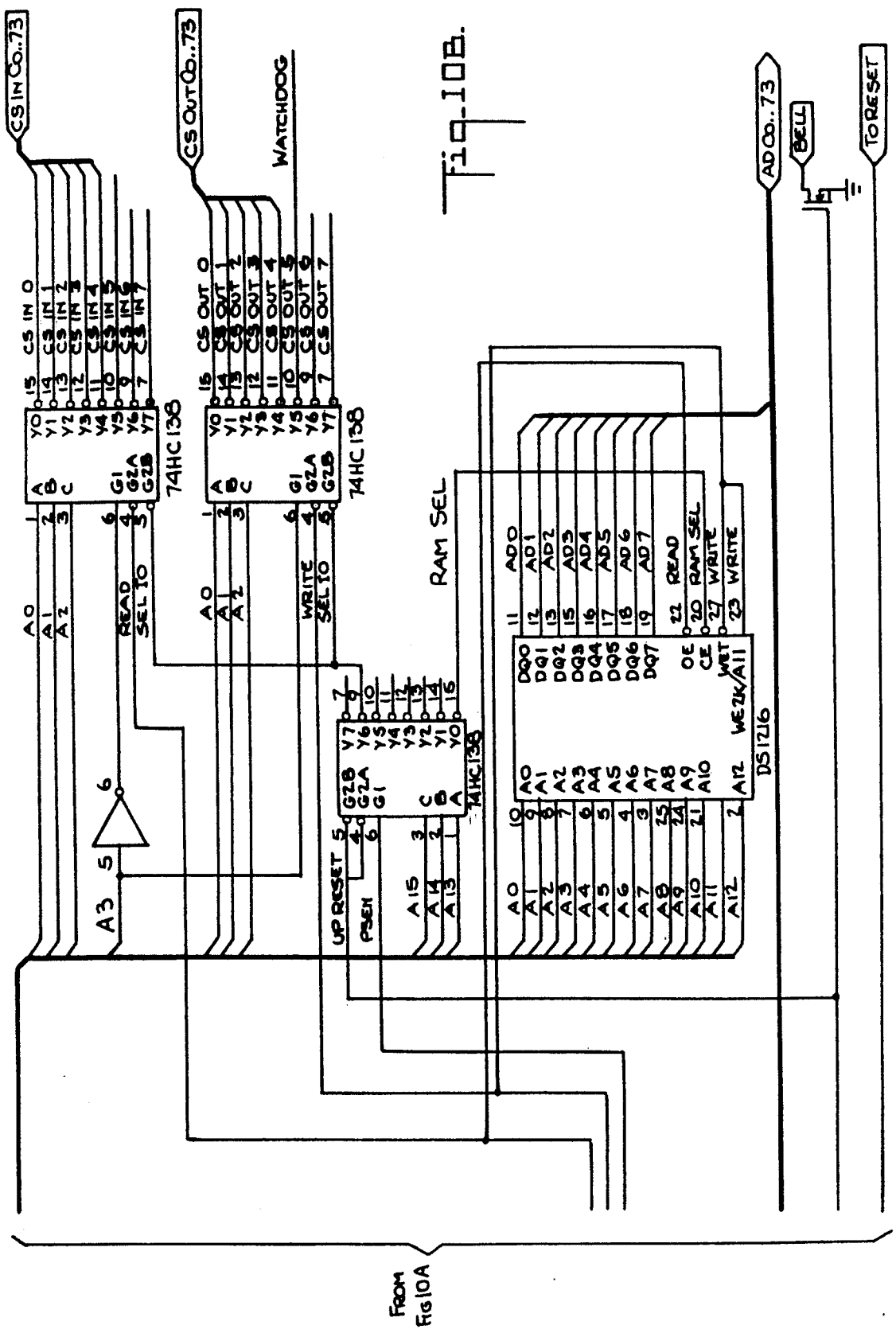

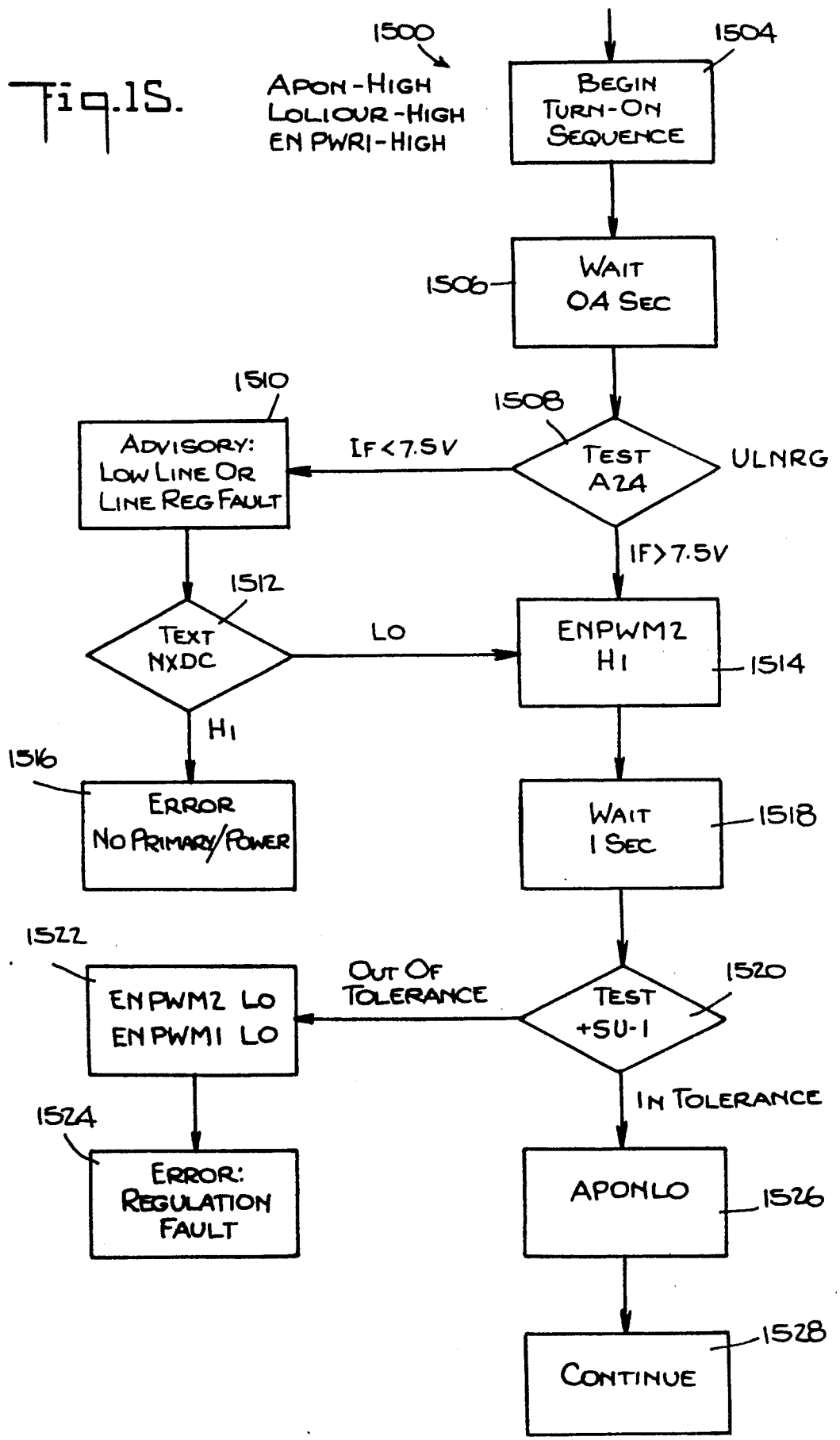

COMPUTER-CONTROLLED UNINTERRUPTABLE POWER SUPPLY

BACKGROUND OF THE INVENTION

The invention disclosed herein relates generally to a computer-controlled power supply system, and particularly to an uninterruptable computer-controlled power supply system which selectively operates from more than one input source of power, e.g., an AC input, an external DC input and internal batteries. More particularly, the power supply system is of the type which utilizes one or more switch mode converters and is especially suited for use in computer systems.

SUMMARY OF THE INVENTION

The present invention provides a computer-controlled power supply system which monitors a number of functions under computer control and reacts automatically to the monitored functions to follow a programmed course of action which may include changing operation of the system or providing an indication of the status of monitored functions. The computer controlled power supply system according to the invention is uninterruptable in the sense that it operates automatically without external intervention from more than one input sources of power, e.g., from an AC power input source, an external DC input power source, or for a relatively brief period of time, from internal batteries. The power supply system automatically detects the presence and condition of an AC power input and a DC power input, and the condition including charge status of the internal batteries. The power supply system is programmable to operate from the AC power input, when one is present, or the external DC power input when one is present, and to automatically transfer from one power source input to another upon detecting that a power input is not within prescribed limits. The power supply system is capable of transferring operation of the system from one power input to another or to internal batteries without interrupting regulation and in synchronism with internal system operation so that the transfer is transparent to any loads connected to the power supply system. A transfer takes place quickly, e.g., within a single cycle of a clock which is substantially faster than the switching frequency of a switch mode regulator in a regulating loop of the system.

In the specific embodiment, the system transfers to the external DC power input when the AC power input is not present or not within prescribed limits, and transfers to the internal batteries when both the AC power input and the external DC power input are not present or not within prescribed limits. If the condition of the internal batteries is not within prescribed limits when the system is operating from internal batteries, the power supply system automatically enters a shut down mode. The power supply system is also programmed to transfer from internal battery operation to the AC input or the external DC input when the respective input returns to prescribed limits.

In the preferred embodiment of the power supply system, the system is configured to communicate with a host computer. To that end, an RS 232 port and/or a modem are provided. The host computer and the power supply system computer are configured to communicate with each other, with the power supply computer providing data to the host computer and the host computer down loading variable parameters and commands into the power supply computer. Use of the terms "computed-controlled power supply system" and "power supply system computer," and similar terms, are used broadly and meant to include microcomputers, microcontrollers, microprocessors with associated memory, etc.

The power supply system also includes battery charging circuitry which continuously charges the internal batteries when the system is operating from an AC power input or an external DC power input. The internal batteries continuously provide power to portions of the microcomputer section of the system to maintain information stored in volatile memory and to enable the microcomputer to exercise control over the system at all times. The batteries may also provide power to the battery charging circuitry and appropriate monitoring circuits under computer control. The battery charging system operates in three charging modes: (a) bulk charge mode in which the internal batteries are charged at a constant rate, e.g., approximately $\frac{1}{4}$ of the ampere/hour rating of the internal batteries; (b) overcharge mode in which the internal batteries are charged until the charging current has fallen below a prescribed limit indicating that the batteries are effectively fully charged, and (c) float mode into which the system automatically enters when the overcharge mode is completed and in which the charging current is maintained sufficient to replenish the power drain from the batteries.

The internal batteries may maintain system operation for from about 2 to about 15 minutes depending on load. During that time, the system informs the host computer that the power supply system is operating from batteries so that the host computer system may store data and otherwise prepare for a power shut down. The system is capable of calculating the length of time that the power supply system will operate at the current power drain at which it is currently operating. This calculation takes into consideration the type of batteries and their charge status, as well as the power drain. When the system calculates that operation from batteries will be less than a prescribed time, e.g. minutes or a fraction of a minute, the system so informs the host computer, which then may automatically enter a shut down mode. The power supply system itself enters a shut down mode shortly before, e.g. milliseconds, the batteries are incapable of sustaining operation. Prior to that time, the power supply system informs the host computer of the time remaining for normal operation from internal batteries, and the host computer may simply provide an advisory, or prepare for shut-down. The power supply system periodically calibrates battery status to maintain a true estimate of available battery energy. This feature allows optimized operating time after a primary power loss and avoids the danger of an unexpected shut down. In a specific embodiment, the system is provided with information on the battery ampere hours at full charge, and determines the current volt/ampere battery drain. From that, the system computes the time left during which the battery can provide the present volt/ampere power. The system may also be provided with information relating to battery aging to adjust the battery volt/ampere rating at full charge thereof.

In accordance with the invention, traces on circuit boards along which load currents flow may be utilized as sense resistors, which in turn may, for example, be utilized to determine load current to disk drives, a host computer, etc. Since the resistance of circuit board traces may vary from circuit board to circuit board, the system calibrates the traces by comparing the resistances thereof to known, precision resistances. This is accomplished using an internal analog-to-digital convertor to sense the voltage at opposite ends of the trace under known conditions, thereby determining the volt age drop across the trace under known conditions. The trace resistance as calibrated is then used as a current sense resistance.

The system includes watchdog circuitry which resets the microcomputer if the microcomputer fails to provide a control signal to the watchdog circuitry within a predetermined time period. If the microcomputer fails to respond to a watchdog circuitry reset, then an alarm condition is set. The system goes farther and tests the watchdog circuitry itself, forcing a reset condition and monitoring the watchdog circuitry to determine its response.

Power supplies today, particularly for computer systems employ switch mode converters because of their relatively high efficiency. Switch mode converters which deliver relatively large amounts of output power typically have a low power factor (PF), and when delivering relatively high power outputs, draw a nonsinusoidal current having high peaks. Such high-peak nonsinusoidal currents stress circuit breakers, AC outlets, AC wiring and transformers, which presents a problem since many personal computer systems operate from standard AC wall outlets. The power supply system according to the invention includes means for correcting the power factor so that it is continuously at or close to unity.

The power supply system according to the invention has multiple regulated DC outputs. For example, a number of +5 V DC and +12 V DC outputs may be provided for use in a computer system. The power supply system exerts on-off control over some or all of the output voltages which enables the power supply system to sequence the DC outputs when the system is turning on to avoid excessive turn-on current drain. Such turn-on current may be significant in a computer system utilizing a number of disk drives which draw relatively high current during turn on (e.g., several times the normal operating current). Overrating the supply to accommodate the start-up surge is not cost efficient. According to the invention, the power supply sYstem sequences the power to the drives, which limits the start up surge to that for one drive at a time. This allows the power supply rating to more clearly match the system requirements. For example, individual or groups of outputs may sequentially be enabled either after a specified delay or after verification of satisfactory turn on of the previous supply or group. The delay for sequencing can be specified for each output or group in a table stored in memory from zero to 254 seconds. In the auto delay (auto-sense) mode, the system monitors the rate of change in current drawn by a particular load or group of loads. When the rate of change drops to a predetermined percentage of the initial value, e.g. 15%, the next output or group is enabled. When the power supply system is used to power a computer system having a number of disk drives, sequencing the output voltages to the disk drives reduces the overall current drain during system turn-on. For example, in a multi-user 80386 system including a number of disk drives, the turn-up current if all disk drives are energized at once may exceed 15A. In accordance with the invention, sequencing the output voltages to the disk drives maintains the current drain from the AC line to well below 15A so that conventional AC wall outlets supplied through 15A circuit breakers or fuses may be used.

The power supply system includes at least one fan and a number of sensors which sense temperature at a number of locations in the power supply. For example, three sensors may be provided. One sensor monitors ambient temperature, for example, the temperature at the front panel or the air intake temperature. Another sensor monitors the air output temperature. A third sensor monitors the temperature at a hot spot within the power supply, for example, at a transformer or switching transistor. The sensed ambient and exhaust air temperatures may control fan speed, while the sensed hot spot temperature may trigger an advisory or shut down. Under control of the microcomputer, the speed of the fan is regulated in accordance with the sensed temperatures. This feature allows the system to reduce fan speed and the noise level of the power supply system during substantial periods of operation when the power supply system is not under heavy load and/or the ambient temperature is normal. Since the input or front panel air temperature is monitored, the fan motor speed may be increased or decreased with increasing or decreasing ambient temperature, respectively, which, for example, prevents the temperature at a hot spot from rising substantially even though the ambient temperature is rising. The sensor sensing the fan exhaust temperature is utilized by the system in a similar manner to control system cooling. For example, when the power supply system is turned on, the fans operate at full speed and then slow to the speed determined by the system in response to the sensed exhaust temperature. Using a hot spot sensor, the system may operate to detect a sudden rise in temperature or a temperature not within prescribed limits, and thereby detect a fan failure or other fault condition, and either cause the system to shut down or provide a warning. Included in the configurable parameters (discussed below) of the system are temperature parameters determining the specific temperatures to which the system reacts to adjust fan speed or issue an advisory. In the preferred embodiment, two fans are provided. If one fan fails, the other is operated at a higher speed to compensate for the loss.

During start up, the power supply system monitors prescribed functions and prevents power turn on upon detection of prescribed faults. The system includes a manual override capability to allow the system to turn on even when such faults are detected. It is preferred that a detected fault in a primary source (the AC power input or the external DC power input) not be overridable. The power supply system includes means for indicating certain fault conditions. Such means may be embodied by an enunciator and/or a visual display such as a light emitting diode (LED).

Among the parameters that the system monitors (directly or indirectly) are: AC power input line condition; AC and external DC power input supply current; AC and external power input supply voltage; the various temperatures described above; internal battery voltage charge status; and rate of recharging.

Reporting is available to a host computer through an RS 232 port (or a modem). The internal batteries power the RS 232 port (or modem) and the microcomputer at all times to allow continuous communication between the power supplY system and the host computer. The power supply system may warn the host of imminent shut down and may report logging of selected conditions. Companion software in the host computer may provide, as mentioned, safe shut down of the computer system and automatic restart. Such host system software may also provide logging to disk file of conditions such as loss of primary power, line transients or sag (brown out) and variations in supply current. Statistics as to supply conditions may be maintained by the power supply system from initial power on and can be interrogated on demand through the RS 232 port. A fault is maintained in the power supply system which can be interrogated to determine the cause of a system fault. The power supply system may also be operated remotely through commands from the host through the RS 232 port.

The power supply system reports power supply and power source conditions to a number of status outputs including the following: power good signal (this signal is normally used in a PC, PC-XT and PC-AT systems for master reset); AC loss; external DC loss; normal operation (the power supply system is operating on stable primary AC or DC power); system fault (a condition has been detected that affects normal operation of the supply, typically a failure in a back up battery or cooling fan). Many of the supply parameters are down loadable from the field to provide customization. Such parameters include power supply sequence times, minimal acceptable battery level, power good signal details, communication parameters, logging file characteristics and others.

The system includes analog to digital conversion circuitry. According to the preferred embodiment, the analog to digital conversion circuitry clock is approximately 4 MHz and approximately 26 conditions are monitored. A monitoring cycle takes approximately 3 seconds.

Detected problems may be separated into three classes: (a) problems that do not impair the operation of the power supply system, but may reduce performance; (b) problems that keep the supply from operating as an uninterruptable power supply ("UPS"), i.e. prevent the system from operating from external AC or DC; and (c) problems that keep the power supply system from operating at all. Class "a" problems are simply recorded in the system fault log and reported over the RS 232 port. Class "a" problems may include the following: internal batteries not delivering rated capacities; fan failure that can be compensated for (e.g., in a two fan system, by running one fan at a higher speed) (this may become a class "b" fault when the power supply is switched off); change in status of AC or DC inputs from the condition at power up; failure in the ability to measure one or more of the supply currents; failure of charging circuitry with the battery fully charged (this may become a class "b" problem if it is not corrected in 8 hours); failure in the watchdog timer circuit (this may become a class "b" problem when the supply is switched off); and power line transit (spike or sag).

Class "b" problems are those that prevent the power supply system from operating as a UPS system. If a class "b" problem is detected at start up, the supply is not allowed to come on. However, this may be manually overridden. Otherwise class b problems are logged and reported via the RS 232 port. Class "b" problems may include the following: internal bat tories do not have full charge (at start up) or the internal batteries do not have enough charge to sustain one power loss/shut down cycle; a charge circuit class "a" fault that is more than 8 hours old; a watchdog timer circuit fault during turn-on; and failure of the cooling fan during turn on.

Class "c" problems are those that prevent the power supply system from operating at all. They cannot be overridden and may include the following: failure of the microcomputer; failure of a switch mode regulator circuit; a sustained over/current condition; and detection of the maximum operating temperature.

Configuration options are stored in a non-volatile memory and may be varied by down loading from a host computer. Configuration is accomplished through the RS 232 port and may be safeguarded by use of a password system.

Table I lists the digital status input lines; Table II lists the digital control output lines; Table III lists the analog input (monitor) channels; and Table IV lists the configurable data; Table V lists the event control items.

The invention provides a power supply system comprising means for rectifying an ac power input, when one is supplied to the system, and providing a rectified signal; first regulating means for regulating the rectified signal and providing a first regulated DC signal, the first regulating means including a first switch mode regulator; second regulating means for regulating a DC signal and providing a second regulated DC signal, the second regulating means including a second switch mode regulator having a switching frequency; control means for causing either the DC power signal, or the first regulated signal when both the DC power signal and the AC power signal are supplied, and one of them when only one of them is supplied, to be coupled to the second regulating means; the control means being settable to cause a preselected one of the power signals to be coupled to the second regulating means when both power signals are supplied.

The control means may comprise logic circuitry and may also comprise a programmable computer.

The power supply system includes a DC battery providing a third DC power signal, and the control means causes the third DC power signal to be coupled to the second regulating means when both the first AC power signal and the second DC power signal are not supplied or not within prescribed limits. The control means automatically causes the system to replace whichever power input signal is being coupled to the second regulating means, when that power signal is not within prescribed limits, with another other power input signal or the battery power signal. Replacement may be in accordance with a preset priority sequence.

The control means automatically switches back to a power input signal when it is again within prescribed limits.

The control means includes circuitry coupled to a clock which causes a change in coupling of the power signals to the second regulating means within a cycle of that clock, that clock having a frequency substantially higher than the switching frequency of the second regulating means, whereby the change in coupling by the control means from one input power signal to another is without interruption of regulation and transparent to a load coupled to the power supply system.

The power supply system includes means coupled to the battery for determining the condition of the battery; and the control means includes means determining, when the DC input signal from the battery is coupled to the second regulating means, the length of time that the system may safely operate from the battery. That time is made available for use or storage. The battery condition determining means determines the condition of the battery from the rate Of charging thereof.

In accordance with the invention a control system is provided for controlling a system such as power supply. The control system includes a computer and a watchdog circuit coupled thereto to monitor operation of the computer and reset the computer when the watchdog circuit detects a fault therein. The watchdog circuit and the computer also include means to periodically self test operation of the watch dog circuit.

The computer-controlled power supply system includes according to the invention a local computer for controlling operation of the power supply system, means programmable in the local computer for causing the local computer to control operation of the power supply system based on a plurality of parameters, a communication channel for communicating with a host system, and means cooperating with the host system for downloading from the host system at least one of the parameters.

BRIEF DESCRIPTION OF THE DRAWINGS

The invention is illustrated by way of example and not limitation in the figures of the accompanying drawings, in which like references indicate similar elements, and which:

FIG. 3 is a simplified block diagram of the AC loop portion of the system depicted in FIG. 2;

FIG. 4 is a wave form of the input AC voltage to the AC loop portion of the system depicted in FIG. 2;

FIG. 5 is a schematic circuit diagram of the transfer logic block and part of the pulse width modulator block of the system of FIG. 1;

FIG. 6 is schematic circuit diagram of the analog power control block of the system of FIG. 1;

FIG. 7 is a schematic circuit diagram of the fan speed control block of the system of FIG. 1;

FIG. 10, consisting of FIGS. 10A and 10B, is a schematic diagram of a portion of the microcomputer section the system depicting the microprocessor and the watchdog timer;

FIG. 15 is a flow chart of initial power up sub-routine of the main operating loop charted in FIG. 12.

DESCRIPTION OF THE PREFERRED EMBODIMENTS

Figure 1A:
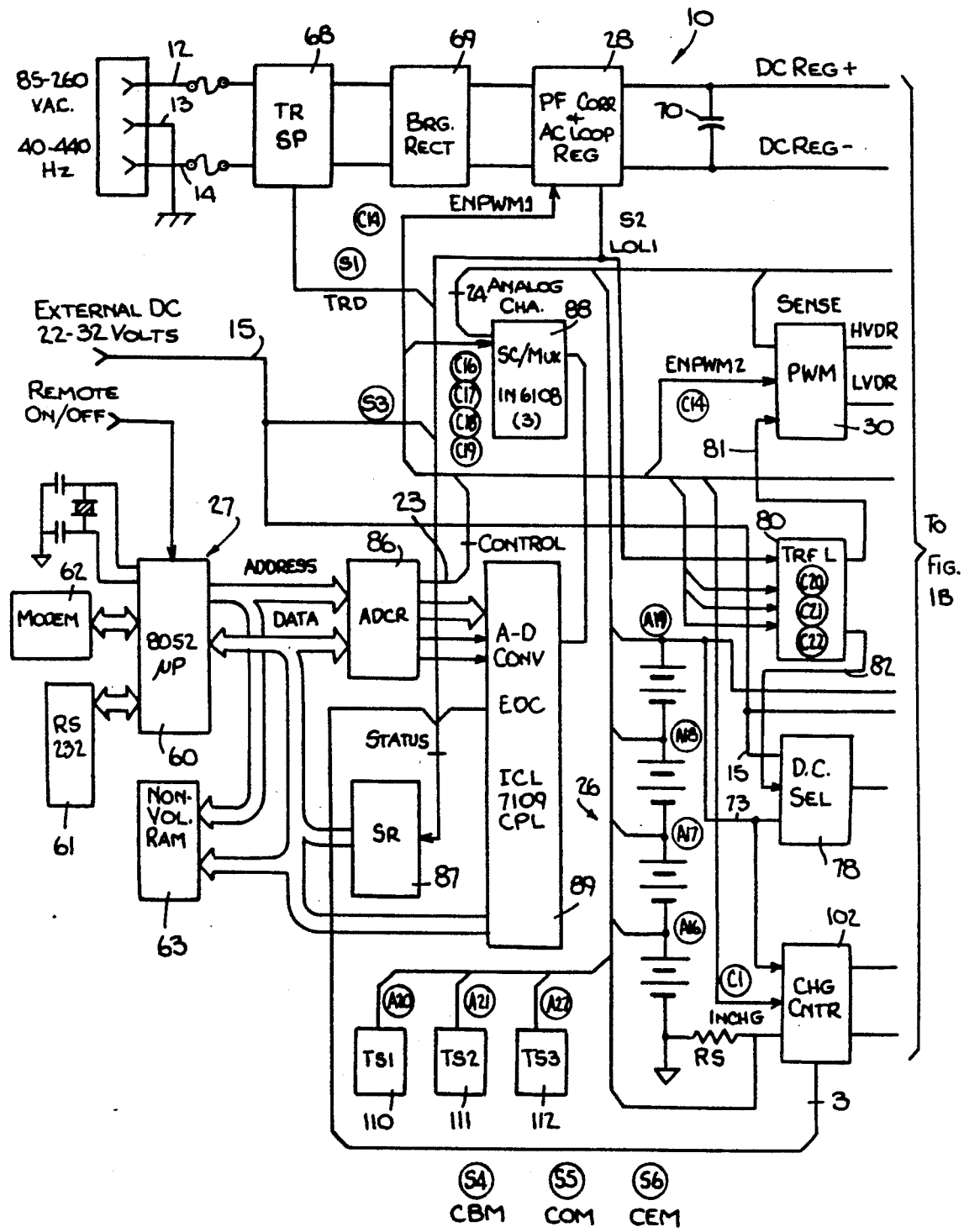
FIG. 1, consisting of FIG. 1A and 1B, is a block diagram of an uninterruptable computercontrolled power supply according to the invention.
Figure 1B:
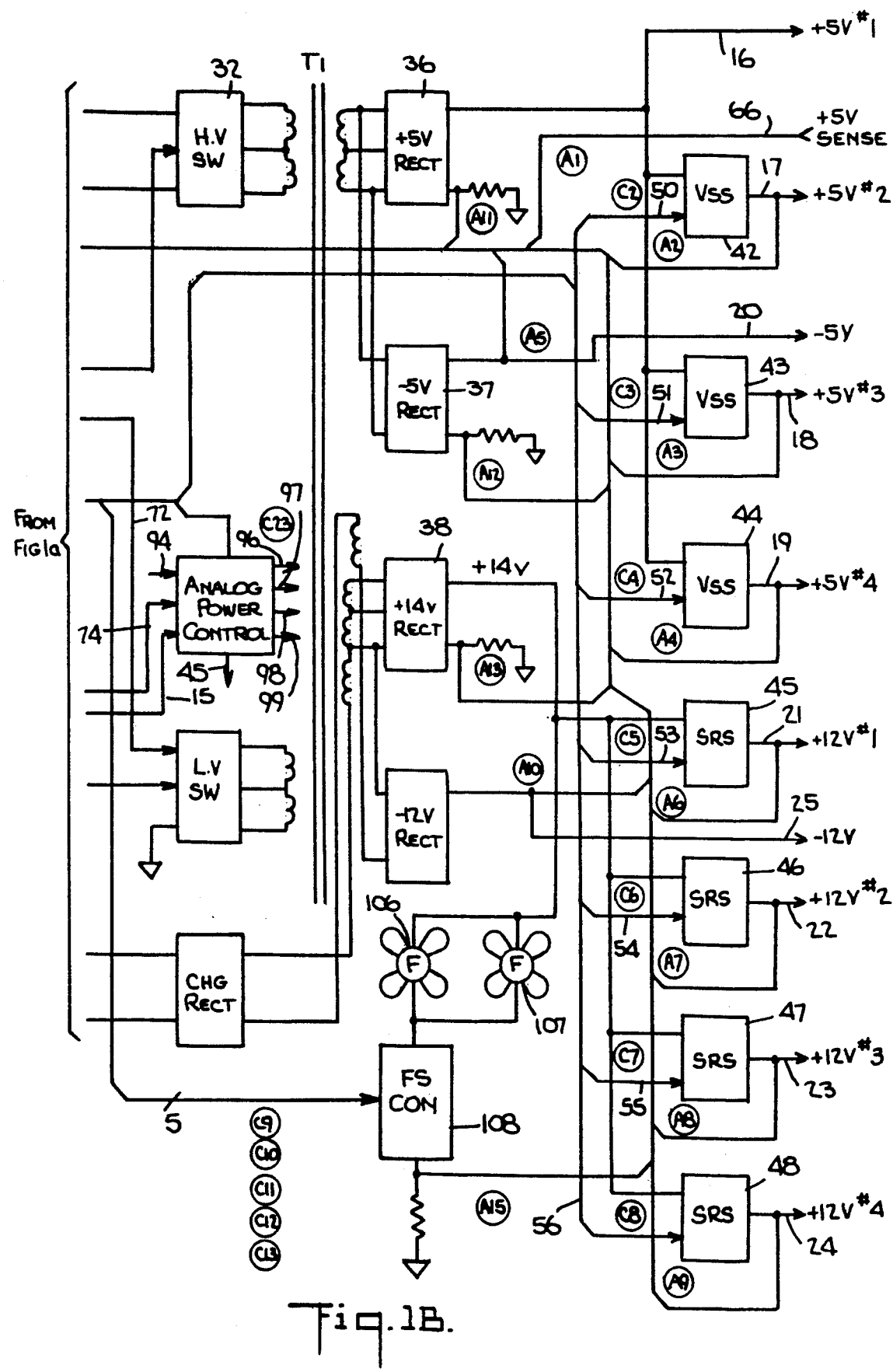

FIG. 1 depicts computer-controlled power supply 10 which receives AC line power on lines 12, 13 and 14 and optionally an external DC source on line 15, and provides regulated DC outputs on lines 16–25. In the embodiment described herein, system 10 operates from (a) an AC line of from about 85 V to 260 V AC in the frequency range of from about 40 Hz to about 440 Hz; (b) an external DC input of from about 22 V to 32 V DC; and (c) an internal battery supply of nominally 26 V DC; and provides regulated 5 V DC on line 20; regulated +12 VC DC on lines 21–23; regulated −12 V DC on line 25; and other regulated voltages for internal use. Internal batteries 26 provide continuous power to selected circuits such as parts of microcomputer 27 which control operation of system 10 and monitoring and storing functions, and to battery charging control circuitry ("CHG CNTR") 102, and provides backup power upon loss of primary power. An AC regulation loop is provided within block 28, power factor correction and AC loop regulation ("PF CORR & AC LOOP REG"). A DC regulation loop is provided by pulse width modulator circuitry ("PWM") 30, either high voltage switching circuitry 32 ("HV SW") or low voltage switching circuitry ("LV SW") 34, and transformer T1 and rectifiers ("RECT") 36–39. Rectifier 36 ("+5 V RECT") provides +5 V DC directly to line 16 ("+5 $V_{-1}$"), and to lines 17–19 (+5 $V_{-2}$, +5 $V_{31\ 3}$, +5 $V_{-4}$) via voltage sequencing switches ("VSS") 42, 43, 44, respectively. Rectifier 37 ("−5 V RECT") provides −5 V DC directly to line 20 (−5 $V_{-1}$). Rectifier 38 ("+14 V RECT") provides +14 V DC to lines 21–24 (+12 $V_{-1}$, +12 $V_{-2}$, 12 $V_{-3}$, 12 $V_{-4}$) via sequencing regulator switches ("SRS") 45–48, respectively. Rectifier 39 ("−12 V RECT") provides −12 V DC directly to line 25 (−12 $V_{-1}$). Voltage sequencing switches 42–44 and sequencing regulator switches 45–48 are controlled by microcomputer 27 via control signals C2–CB on inputs 50–56, respectively. A list of control signals is given in Table II. Microcomputer 27 may thus control gating of individual regulated DC outputs to loads as either a protection measure should any load show excessive current, or to power to individual loads to prevent excessive power drain during system turn on.

Computer 27 includes microprocessor 60 (e.g., 8052) which monitors and controls all functions of power supply system 10, and also provides the ability to communicate with a host computer or a service center via an RS-232 port 61 or a modem 62 and phone lines. Many functions can be configured by the host by entering values in variable tables which are stored in nonvolatile memory 63 (RAM).

As mentioned, the system 10 includes two separate control loops connected in cascade. The first loop (PF CORR. & AC LOOP REG 28) provides AC line regulation over the range of 85 VAC to 265 VAC without the need for manual switches or jumpers and, in addition, provides power factor correction, that is, input voltage and current are maintained in phase and the power factor is kept very close to unity. The AC loop includes transient suppressor ("TR SP") 68, which acts as an AC transient suppressor and line filter and is commercially available, bridge rectifier 69 and one or more filter capacitors 70.

The second loop includes a pulse width modulated, push-pull, forward inverter ("PWM") 30 which accomplishes direct load regulation of the +5 V outputs, which may be remote sensed via line 66 (+5 V SENSE) by a host computer, and pseudo-regulation of the remaining outputs, +14 V and −14 V and −5 volts. The +12 V and −12 V outputs are post regulated by sequencing regulator switches (SRS) 45-48 which, as mentioned, also act as on-off switches, in order to permit operation of multiple high capacity disk drives without the necessity of providing sufficient peak power to start all disk drives simultaneously. Several separate +5 V (+5$_{-2}$ through +5 V$_{-4}$) and +12 V (+12 V$_{-1}$ through +12 V$_{-4}$) outputs are turned on sequentially, under microprocessor control, at power up, so that supply need only provide spin-up current for one disk drive motor at a time.

Depending on the source of input power, either the high voltage switching circuitry 32 or lOW voltage switching circuitry 34 operates to supply pulse width modulated AC power to the primary of transformer T1. All of rectifiers 36-39 are coupled to the secondary of transformer T1 and therefore are provided with AC power regardless of the source of input power. High voltage switching circuitry 32 operates from pulse width modulating circuitry 30 via line 71 when the input power source is the AC line, and low voltage switching circuitry 34 operates from pulse width modulating circuitry 30 via line 72 when the input power is either an external DC source supplied on line 15 or battery power supplied from internal batteries 26. A DC select circuit ("DC SEL") 73 selects either the external DC source from line 15 or the internal battery source on line 74 and supplies DC to the low voltage switching circuitry 34 on line 75.

Load transfer logic circuitry ("TRF L") 80 is so configured that if the AC line falls below a preset threshold, the load is transferred to an external DC power source, if one is connected on line 15, otherwise the load is transferred to internal batteries 26. Transfer takes place within one cycle of the push-pull forward inverter (about 28 microseconds) and always at the beginning of the next cycle after low-line is detected, so that no pulses are lost, thus avoiding the possibility of magnetic core saturation, etc., and appearing transparent to the load. Peak current is detected in all inverter switches on a pulse-by-pulse basis and the pulse is truncated if the safe threshold is exceeded.

Transfer logic circuitry 80 supplies control signals on lines 81 and 82 to DC select circuit 73 and to pulse-width modulator circuitry 30, respectively, to enable either DC select circuit 73 or the pulse-width modulator circuitry 30 to operate from the AC line or one of the DC sources, respectively.

Operation of system 10 is controlled by microcomputer 27 which includes microprocessor 60, non-volatile random access memory (RAM) 63 and associated decoding and latch circuitry represented by address control registers ("AC CR") 86, status register ("SR") 87, multiplexers ("MUX") 88 and analog to digital converter 89.

An analog power control circuit 93 receives the external DC on line 15, the battery voltage on line 73, and an internally-generated voltage on line 94, and provides: a control signal "NXDC" on line 95 indicating whether external DC is present and above a predetermined magnitude; a +5 V DC (+5 ANA) and −5 V DC (−5 ANA) supply voltages on lines 96 and 97, respectively, for the system's is analog circuits; a +5 V DC (+5 DIG) supply voltage on line 98 for continuously powering the microprocessor; and a +12 V DC (+12 INDG) supply voltage on line 99 for use within system 10.

System 10 also includes circuitry for charging batteries 26 and for controlling the charging thereof. Charging rectifier ("CHG RECT") 100 receives low voltage DC from the secondary of transformer T1 and supplies rectified DC to charging control circuit ("CHG CONT") 102, which controls battery charging.

System 10 further includes fans 106 and 107, fan speed control circuit ("FS CONT") 108 and temperature sensors ("TS1-TS3") 110-112. Fans 106 and 107 are connected in parallel to receive low voltage DC (+14 V DC) from rectifier 38. Fan speed control circuit 108 adjusts the current through fans 106 and 107 in sixteen discrete settings as controlled by microprocessor 60 via control lines from address control register 86. Temperature sensor 110 is placed at the air intake to fans 106 and 107, temperature sensor 111 is placed at the air output from fans 106 and 107, and temperature sensor 112 is placed adjacent a high temperature area of the system, e.g., adjacent transformer T1. Microprocessor 60 controls the speed of the fans in dependence on the air intake, air out take, and may shut the system down and/or issue an advisory based on the temperature at the high temperature (hot spot) area.

Microprocessor 60 monitors the charge condition of the internal batteries 26, and when battery operation commences, is able to determine from the current drain from the batteries how long operation can continue before data might be lost. Microprocessor 60 warns the host that shut-down is imminent so that the host computer may begin storing files and registers so that the system can easily recover when power is restored.

All analog signals (A01 through A24) (Table III) monitored by the system are normalized and conditioned by amplifiers before being supplied to AD converter 89 by multiplexers 88.

Control lines (C01 through C26) (Table II) originate with microprocessor 60 and perform various control functions. Digital status lines (S01 through S08) (Table I) report the status of various circuits to microprocessor 60 for appropriate action.

In FIG. 1, the blocks designating address control register 86, analog to digital converter 89, status register 87, RAM 63, and MUX 88 may encompass a number of other components, as will be evident to those skilled in the art. Microprocessor 60 is preferably an 8052. Analog to digital converter chip is preferably a 7109. RAM 63, status register 87 and address control register 86 may be comprised of suitable integrated circuits currently commercially available and known to those skilled in the art. RS 232 port 61 preferably employs an integrated circuit designated DS 232. Designations and pin-outs for integrated circuits are indicated in the drawings. Such designations are known to those skilled in the art.

Figure 2:
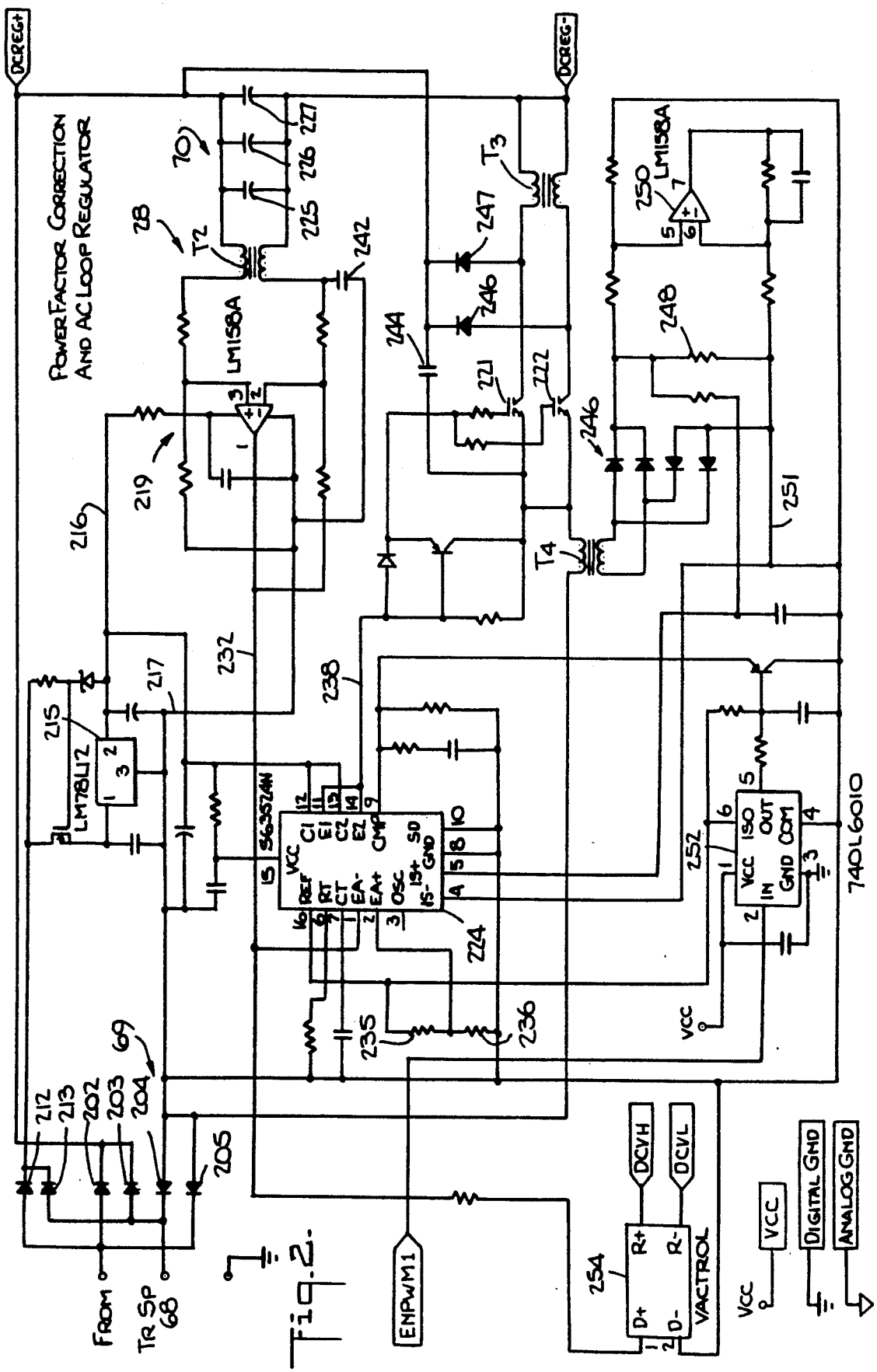
FIG. 2 is a schematic circuit diagram of an AC loop portion of the system of FIG. 1 which provides AC line rectification, AC loop regulation and power factor correction.

Referring to FIG. 2, an embodiment of bridge rectifier 69, power factor corrector and AC loop regulator 28 and capacitor 70 is depicted. Bridge rectifier 69, which comprises diodes 202, 203, 204 and 205, receives the AC input voltage from transient suppressor 68 and provides rectified DC on lines 209 and 210. Diodes 212 and 213 provide rectified DC to floating regulator integrated circuit 215 which provides a floating regulated DC output voltage on lines 216, 217 for use by differential amplifier 219. Differential amplifier 219, switching transistors 221 and 222, and pulse width modulator integrated circuit 224 form, with associated components, a DC to DC switch mode inverter. Pulse width modulator (PWM) circuit 224 operates at a switching frequency of approximately 37 KHz, which provides about 300 pulses per half cycle of the line frequency (at a line frequency of 60 Hz). Capacitors 224, 225 and 226, connected in parallel, represent capacitor 70 in the block diagram of FIG. 1. Transformer T2 couples the AC voltage across capacitors 225-227 to the inputs of differential amplifier 219. Capacitor 242 bypasses the amplifier side of transformer T2 which acts as a choke. Capacitor 244 passes short spikes through commutation diodes 246, 247. The primary of transformer T3 functions as an inductor for transistor 221 and the secondary of transformer T3 functions as an inductor for transistor 222. Differential amplifier 219 provides a signal on its output (line 232) which is proportional to the AC voltage across capacitors 225-227 corresponding to load power drain and capacity charging. PWM circuit 224 receives (input EA—) the output of differential amplifier 219 on line 232 and a reference voltage (REF from PWM 224) on line 234 (input EA+) divided down by resistors 235, 236. PWM circuit 234 compares the signals on its EA— and EA+ inputs and provides driving pulses on line 238 (E1, E2) to switching transistors 221, 222 to cause recharging of capacitors 225-227. Transistors 221 and 222 are connected in parallel to increase the current handling capacity of the transistors as a switch.

Current transformer T4 couples the current to a bridge rectifier 246 which provides a voltage across resistor 248 proportional to the current drawn from the AC supply. Resistor 248 is selected so that a 1/100 turns ratio of transformer T4 provides 200 mv across resistor 248 when the AC input current is about 20A peak. The voltage across resistor R248 is supplied to PWM circuit 224 (input IS+) and cause shutdown of PWM circuit 224 the voltage reaches 200 mv. Operational amplifier 250 provides a 2 V DC output for test purposes corresponding to 200 mv across resistor 248. Integrated circuit 252 is an opto-coupler which functions as an isolator for the control signal ENPWM1 from the microprocessor which when high enables operation of the PWM circuit 224. Amplifier 250 also provides a soft start signal to PWM circuit 224 (input IS—) on line 251 which disables the error amplifier in PWM circuit 224.

The regulated DC output from power factor correction and at AC loop regulator 28 on lines DCREG+ and DCREG— are supplied to high voltage switching circuitry 32. The voltage on lines 210 and 232, proportional to the high and low DC voltage output by bridge rectifier 69, is supplied to linear opto-coupler integrated circuit 254, which provides an output voltage on lines DCVH and DCVL which, in the limited range of interest, is proportional to the input voltage to that circuit. The voltages on DCVH and DCVL are supplied to transfer logic circuitry 80.

Conventions for digital ground, analog ground and chip supply voltage Vcc are given at the bottom of FIG. 2. That convention is followed in the other figures of the drawings.

In addition to providing AC line regulation, circuit 200 also corrects the power factor of the AC input to maintain it close to unity, as described below.

FIG. 3 is a simplified block diagram of the circuit depicted in FIG. 2. FIG. 4 is a wave form diagram depicting the AC voltage input to bridge rectifier 69. The same references have been used in FIGS. 2 and 3 to designate the same parts, whether identical in the two figures or represented in FIG. 4 as an equivalent or in a simplified form. As mentioned above, the PWM circuit 224 operates at about 37 KHz, which for an input line frequency of 60 Hz provides 300 pulses to switching transistors 221, 222 for each half cycle of the line. The AC input currents during each of those pulses may be represented by the equation:

$$i(dt) = \frac{V}{R}(1 - e^{-tR/L}).$$

The corresponding voltage during each of those current pulses is represented in FIG. 4 by V1, V2, ..., VP. In the above equation, "V" represents the input voltage; "R" represents the total loop resistance (excluding $R_1$ which represents the load resistance presented to transformer T2); "t" represents the duration of each of the 300 pulses per half cycle. The current in the loop increases exponentially and approaches V/R after about 10 time constants. The input voltage "V" during the short time "t" (approximately 3 microseconds) may be considered constant. Also during that time "t", the total loop resistance "R" may also be considered constant. Therefore, during that short time period "t", the term $(1-e^{-tR/L})$ may be considered constant, so that the input current during the time period "t" is proportional to the input voltage. This is true for each input voltage V1, V2, ..., VP. Integrating the voltage over a half cycle yields the result that the input current is always proportional to the input voltage, and therefore the power factor is always unity. Thus, the AC loop regulation provides an active power factor correction function.

For constant values of V=90 V; L=150 uh; R=1 ohm, the final value of i(t) at t=infinity is 90 A. When t equals the time constant L/R, i(t)=56.9 A. At t=5 us, i(t) =2.95 A; at t=10 us, i(t)=5.8 A. At t=15 us, i(t)=8.5 A. Similarly, with the regulator switching frequency f=37 KHz and /f=27 us, a 90% duty cycle yields (0.9)(27 us)=24.3 us: At t=24.3 us, i(t)=13.46 A.

FIG. 5 depicts the circuitry comprising the transfer logic circuitry 80 and part of the DC loop pulse width modulator circuitry 30. Transfer logic circuitry 80 provides the driving pulses to high voltage switching circuitry 32 and low voltage switching circuitry 34 depending on the condition of the AC line, the external DC input, if one is present, and the internal batteries 26. Driving pulses on outputs ACDRA and ACDRB are supplied to the high voltage switching circuitry 32 when the AC input is acceptable. When the AC line input is not acceptable, and an acceptable external DC source is present, transfer logic circuitry provides driving pulses on lines XTDRA and XTDRB to low voltage switching circuitry 34. If an acceptable DC source is not present, transfer logic circuitry provides driving pulses on lines ITDRA and ITDRB to low voltage switching circuitry 34. Low voltage switching circuitry 34 preferably includes a pair of low voltage switches coupled to transformer T1, one switch operating from XTDRA, XTDRB driving pulses, and the other switch from ITDRA and ITDRB driving pulses.

All of the driving pulses originate with pulse width modulator (PWM) circuit 502 of modulator circuitry 30. Circuitry, which may be conventional, forming the remainder of pulse width modulator circuitry 30 is not shown. Flip-flop pairs 504, 505 synchronize transfer of driving pulses from PWM circuit 502 with a system clock which is faster than the switching frequency of PWM circuit 502, which transfer always takes place within a single cycle of PWM circuitry 30 so that the transfer from one power source to an is uninterrupted and transparent to the load.

A voltage which is inversely proportional to the voltage across capacitors 225-227 is supplied from linear opto-coupler 254 (FIG. 2) to amplifier 512. The other input of amplifier 512 receives a reference voltage (VREF/2) from the PWM circuit 502. The output 513 of amplifier 512 which is proportional to the voltage across capacitors 225-227 is supplied to comparator 515 which compares it to the reference voltage (VREF/2). If the output 513 of amplifier 512 is less than the reference voltage, indicating a low or no AC input, the output 514 of comparator 515 is low, and provides a low signal to one input of AND gate 510. The output 513 of comparator 512 is also supplied to the analog to digital converter 89 via a scaler circuit described below, which allows microprocessor 60 to monitor the condition of the AC power input over its entire range.

Connected to the output 514 of comparator 515 is a control signal LOLI from microprocessor 60 which when high overrides the AC line input to cause circuitry 80 to change driving pulses and transfer operation to the external DC input. The other input to AND gate 510 is the inverted (AND gate 517) control signal LOLIOVR from microprocessor 60, which may be used to override an AC low line input. Thus, when the AC line input is low, as manifested in signal DCVL, and there is no override signal (no active LOLIDVR), or LOLI is high, the inputs to AND gate 510 are high, and the output 509 to the J input of flip flop 507 is high. Therefore, on the next clock signal (ADCCK) (e.g., (3.58 Mhz) from A to D converter 89, the Q output of flip flop 507 goes high and on the next drive pulse from PWM circuit 502 on line 520, the output of flip flop 522 goes high. Thus, any transfer from one power input to another is synchronized to the driving pulses output by PWM circuit 502, and because of the speed of the ADCCK clock, no driving pulse from PWM circuit 502 is interrupted.

Accordingly, all "A" and "B" driving pulses from PWM circuit 502 continue to drive the respective high and low voltage switches 32, 34 regardless of the source of input power and the time of transfer from one to another. As mentioned, any clock may be used to clock flip-flop 507 which is fast compared to the switching frequency of PWM circuit 502. This insures that any power input transfer takes place within a half cycle of the PWM circuit 502 switching frequency so that synchronization to the PWM switching frequency may take place without interruption.

Logic circuitry referenced generally by 525 transfers driving pulses to outputs XTDRA, XTDRB, or ITDRA, ITDRB, synchronized to the system clock. Control signal ENIBO enables flip flop 507 and control signal RTACL resets flip flop 507. Signal SSAC is supplied to microprocessor 60 and indicates whether the system is operating from the AC line.

Flip flop pair 505 includes flip flops 530 and 531 which operate similar to flip flops 507, 522 based on the input signal NXDC from the analog power control circuitry (FIG. 6) indicating whether an external DC source is present. When no external DC source is present, line NXDC is high. Control signal ENXDC from microprocessor 60 enables flip flop 530 to transfer source of input power to the external DC source. Signal SSDC from flip flop 531 indicates whether the external DC source is present, and control signal SSBAT from flip flop 531 indicates whether the power source is the internal batteries.

Control signal ENPWM2 from microprocessor 60 enables PWM circuit 502. That signal is fed to the PWM circuit 502 via AND gate 540 (functioning as an inverter), transistor 542, and transistor 544. With control signal ENPWM2 high, transistor 542 is off which turns transistor 544 off to enable the PWM circuit 502. With ENPWM2 low, transistor 542 is on which turns on transistor 544 on to short PWM circuit pin 9 to ground.

Referring to FIG. 6, analog power control circuitry 86 includes comparator 604 which compares the external DC source (XTDC) to a reference voltage (VREF) from the PWM circuit 502. If the external DC source is less than the reference voltage, the output of comparator 602 (NXDC) goes high. As discussed above, the NXDC signal is supplied to the transfer logic circuitry 70. The analog power control circuitry 86 also includes DC regulators 604, 605 which receive the battery voltage (BAT) via transistor 606 and provide the analog supply voltage +5 ANA described above. Transistor 606 is controlled by the microprocessor 60 via control signal APON and transistor 608. APON is used to turn the power supply system on, which may be accomplished remotely. Transistor 606 is turned off to prevent outputting of the +5 ANA supply voltage and thereby save power when the system is in stand-by or has been shut down due to low AC line or low external DC input voltage or a fault condition. When APON is high, transistor 608 is turned on which turns on transistor 66 to supply battery voltage to the regulators 604 and cause regulator 605 to supply the +5 ANA voltage.

Analog power control circuitry 86 further includes regulator 616 which receives the voltage +14 V−1 from the output side of transformer T4. That voltage is only present when the DC loop inverter is operating. Regulator 616 provides a voltage (+12 INRG) for internal system use. Line 620 receives the output of regulator 616 and 604 and provides in OR fashion an output voltage when either the battery voltage is present (BAT) or the +14 V−1 voltage is present. The battery voltage is also supplied to regulator 626 which provides the digital supply voltage +5 DIG to power the microprocessor at all the times regardless of the source of power for the system. Integrated circuit 630 is a polarity reversing circuit which provides a −5 output voltage (−5 ANA) for internal use by the system's analog circuits.

FIG. 7 depicts the fan speed control circuitry 108 of FIG. 1. That circuitry includes programmable counter 704 which receives a clock PWMCK from PWM circuit 502 and the fan control signals FS0, FS1, FS2 and FS3 from microprocessor 60 as divide numbers (divide by 1, 2, 4, 8, 16) to the counter. Counter 704 provides on line 705 a divided down clock having from 1 to 16 clock pulses for each 16 pulses of the PWMCK clock. The number of pulses output by decoder 704 in effect constitutes a duty cycle. Control signal FNEN is a enable signal from microprocessor 60. Capacitor 706 and resistor 707 form a differentiating circuit to switch transistor 709 in and off and provide short output pulses on line 710 n accordance with pulses from decoder 704. The short pulses on line 710 trigger timer 711 which provides from 1 to 16 constant width output pulses on line 712. Sixteen pulses constitutes 100% duty cycle for full speed operation of the fans while one pulse constitutes 1/16th duty cycle for 1/16th speed. Transistor 713 functions as a variable resistor. Fans 106 and 107 are connected to +14 volts on one end and to the FANDRV line at the other end. Therefore, transistor 713 completes the circuit from +14 volts through the fan motors. Resistors 715 provide a sense voltage IFAN1 for monitoring fan current for fault purposes. Microprocessor 60 provides the signals FS0, FS1, FS2, FS3 depending on the temperature sensed by sensors 110–112 in FIG. 1, as will be described below.

Figure 8:
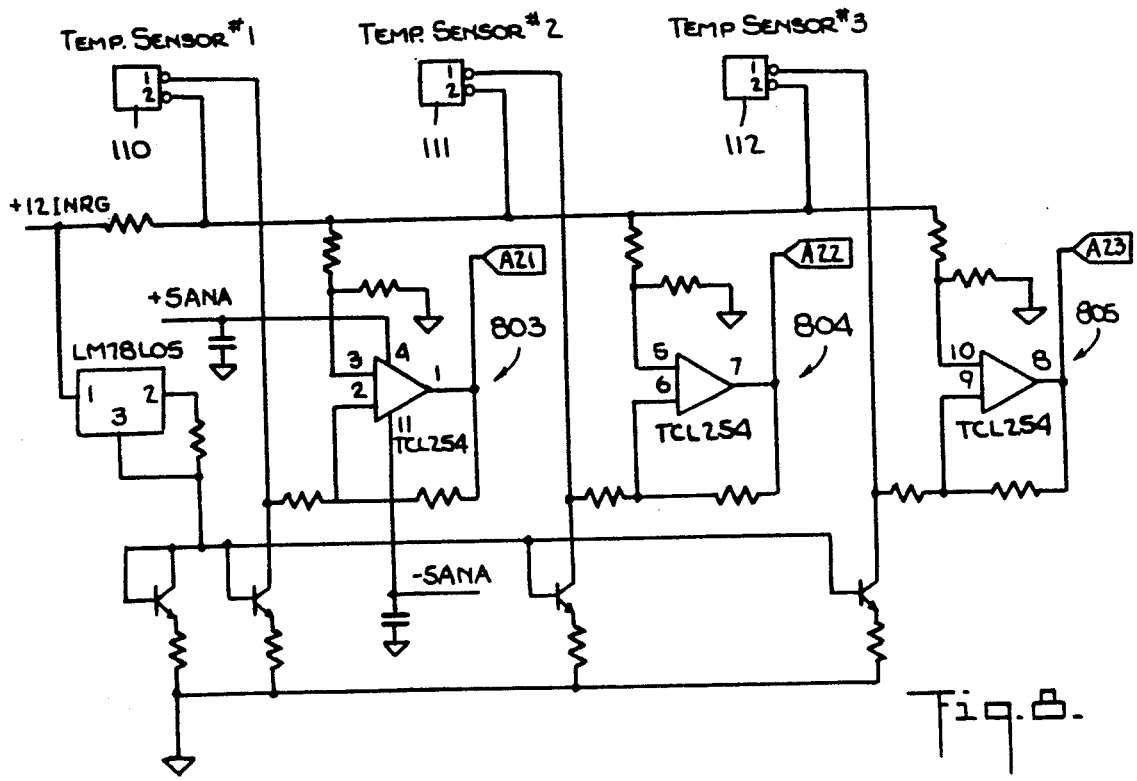
FIG. 8 is a schematic circuit diagram of the temperature sensing block of the system of FIG. 1.

FIG. 8 depicts the circuit schematic for coupling the temperature sensors 110–112 to microprocessor 60. Each sensor is coupled to an operational amplifier 803, 804, 805, which simply acts as a scaler to normalize the voltages which are supplied to analog digital converter 89 on lines A21–A24 respectively.

Scalers similar to those depicted in FIG. 8 are provided for all input voltages to the analog digital converter 89. The scalors normalize the input voltage to be between 0 V and +4 V. If a negative voltage is input to the scaler, the operational amplifier is used as an inverting amplifier to provide a positive 0 to 4 output. Table VII cross-references prescaled analog status lines with lines A0–A24 to A to D converter 89.

Figure 9:
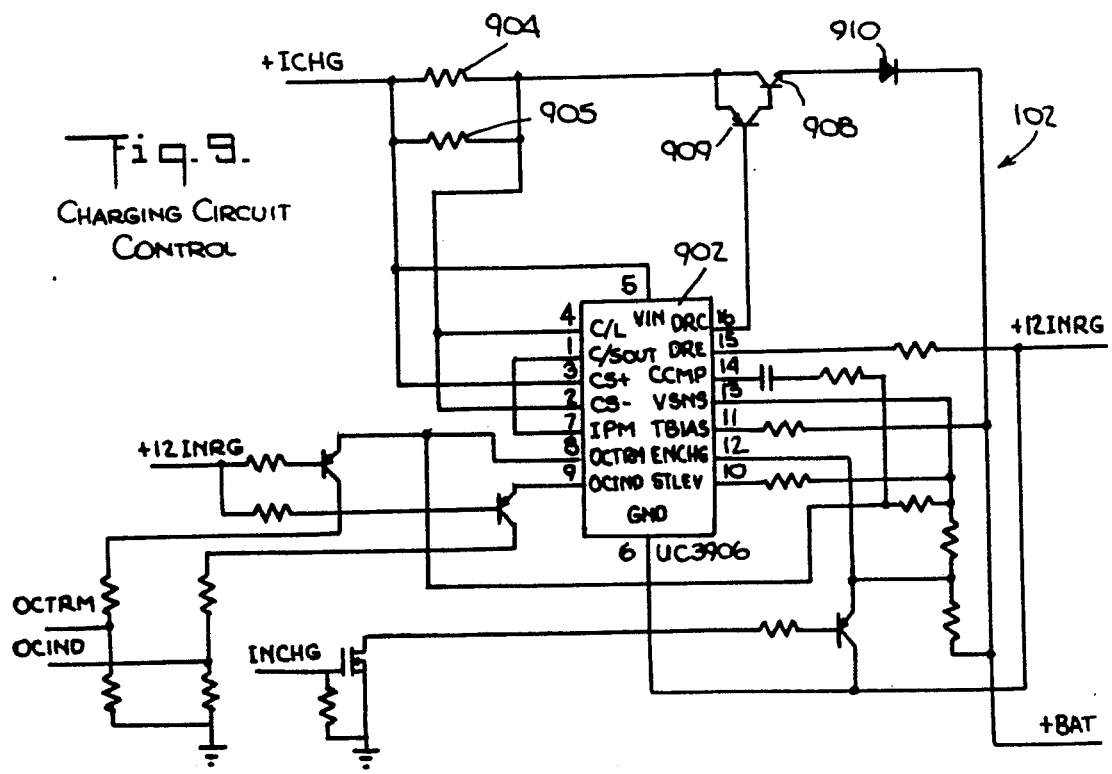
FIG. 9 is a schematic circuit diagram of the charging control block of the system of FIG. 1.

FIG. 9 depicts the charging control circuit 102. Integrated circuit 902, available from Unitrode as UC 3906, controls the current flow to internal batteries 26. The charging current (+ICHG) is fed to sensing resistors 904, 905. The voltage across those resistors is supplied to integrated circuit 902. Integrated circuit 902 regulates the charging current via transistors 908, 909, and the charging current is supplied to the batteries from the emitter of transistor 908 via reverse protection diode 910. Control signal INCHG from the microprocessor 60 inhibits integrated circuit 902. If integrated circuit 902 is operating, pin 8 is greater than 12 volts and control signal OC-TRM to microprocessor 60 is high. If integrated circuit 902 is not operating, pin 9 is greater than 12 volts and control signal OCIND to the microprocessor is high. These signals inform the microprocessor as to whether integrated circuit 902 is controlling charging or not. +12 INRG is an internally generating voltage received from analog power control circuitry 86 (FIG. 6).

Integrated circuit 902 controls transistors 908, 909 to operate in the three modes described above, i.e., in the bulk charge mode, the overcharge mode and the float mode. Integrated circuit 902 determines the mode from the voltage across transistors 904 and 905.

FIG. 10 depicts the watchdog circuit 914 and microprocessor 916.

Figure 11:
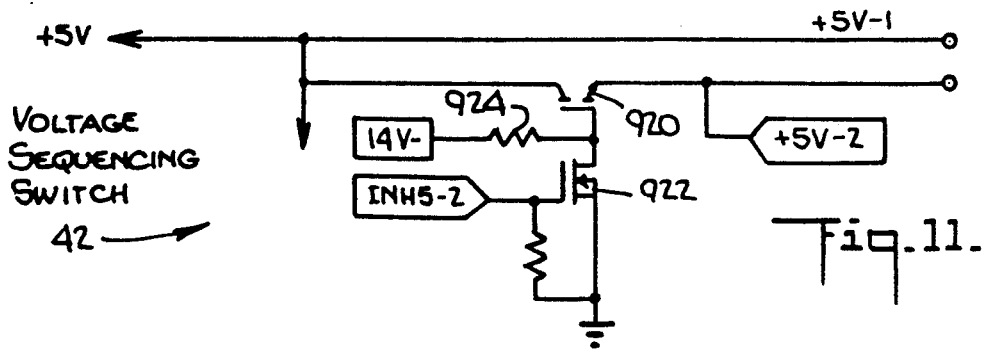
FIG. 11 is a schematic circuit diagram of one of the voltage sequencing switches of the system of FIG. 1.

FIG. 11 is a schematic diagram of voltage sequencing switch 42. Switch 42 includes control transistor 920, and gating transistor 912. Gating transistor 912 gates the regulated +5 V output (+5 V−1) to the output line 17 (+5 V−2). The base of gating transistor 922 is connected to FET control transistor 921. Transistor 921 is turned on by signal INH5-2 from the microprocessor, which essentially grounds the base of transistor 922 to turn it off. When INH5-2 goes low, transistor 910 is turned off, which turns transistor 912 on and gates the 5 volts to output +5 V−2. The internal voltage +14 V−1 is coupled to the base of transistor 912 through resistor 924 and acts as a bias voltage.

Figure 11A:
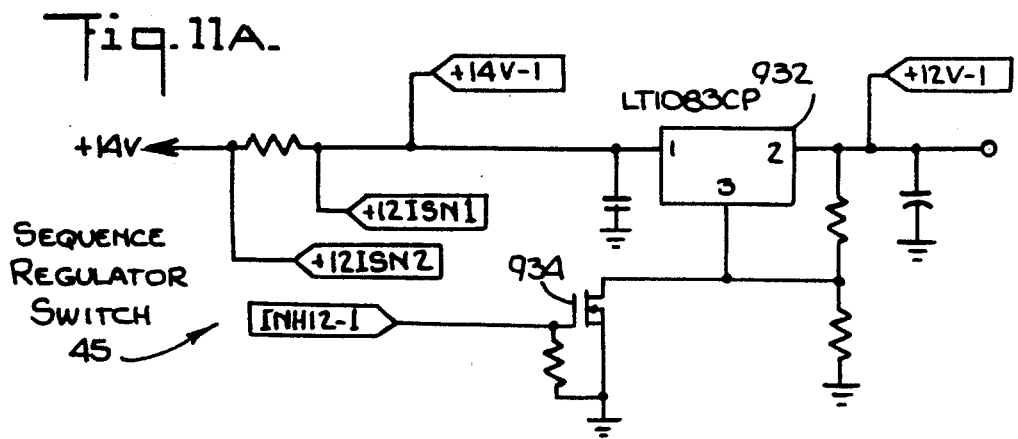
FIG. 11A is a schematic circuit diagram of one of the sequence regulating switches of the system of FIG. 1.

FIG. 11A is a schematic diagram of sequencing regulator switch 45. Switch 45 receives the internal voltage +14 V−1, regulates it and outputs it as 12 voltage on line +12 V −1. Switch 45 includes an integrated circuit regulator 932 and a field effect control transistor 934. Signal INH12-1 when high turns transistor 434 on, to ground pin 3 of the integrated circuit regulator 432, and thereby inhibit it. When INH12-1 is low, transistor 434 is off and integrated circuit 422 is enabled. Voltage sequencing switches 42–44 and sequencing regulator switches 45–48 are controlled by the microcomputer. As discussed above, a respective switch may be gated after a predetermined delay or after a sense routine in which sequencing of the next switch takes place after current to the previously sequenced switch has stabilized or reached an acceptable level.

Figure 12:
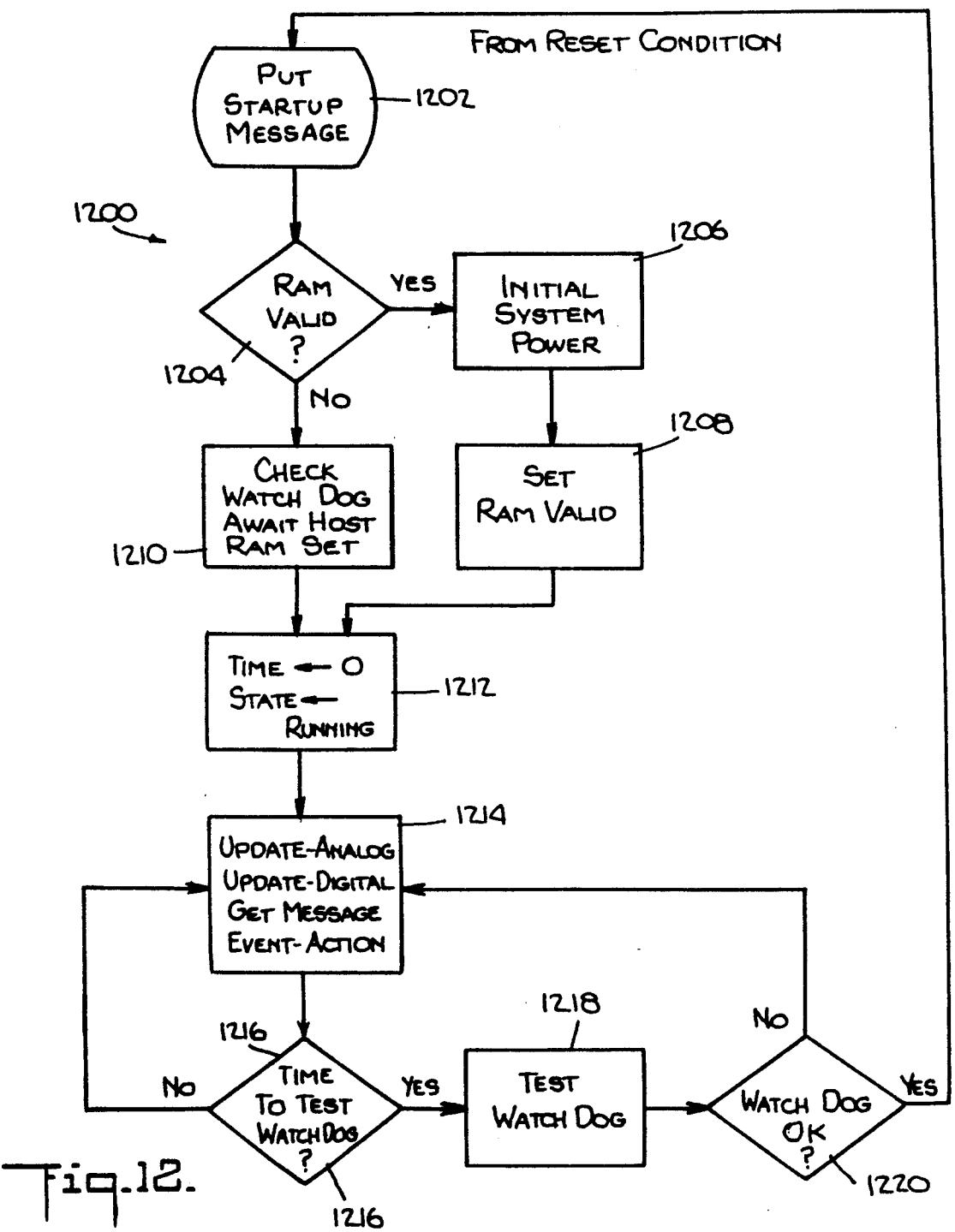
FIG. 12 is a flow chart of the main operating loop of the system of FIG. 1.

FIG. 12 is a flow chart illustrating operation of the main loop of the power supply system 10. Upon system turn on or a reset condition from the watchdog timer test (described below) a start up message is provided in block 1202. RAM 63 is tested in block 1204. If the RAM is valid, the system proceeds to the initialized system power subroutine of block 1206, which is flow charted in FIG. 15. After system initialization in block 1206, "RAM valid" is set in block 1208. If the RAM is not valid, the watchdog circuit is checked in block 1210 as described above, and the system awaits RAM validation from a host system. Power supply system 10 includes a system clock which is used for, among other things, the watchdog test. In block 1212, the system clock is set to zero. Block 1212 also stores the state of the system prior to a reset. In block 1212, the system state is set to "running" for reference with respect to the state of the system prior to being turned on. The system then progresses to block 1214 which includes a subroutine for updating the analog signal, updating the digital signal, communicating with the host computer ("get message") and the subroutines depicted in FIGS. 13 and 14 for the digital and analog event actions.

The system cycles through a sub-loop consisting of block 1214 and block 1216 continuously performing in block 1214 the analog and digital update routines, the communication routine and the event action routines and in block 1216 determining whether it is time to check the watchdog circuit. The system clock (set to zero in block 1212) is compared in block 1216 to a preset time, for example, 24 hours. When the clock reaches the preset time, the watchdog circuit is tested in block 1218. In the watchdog circuit test, the microprocessor stops strobing the watchdog to simulate inactivity of the microprocessor and a timer is set. The watchdog circuit is configured to output the reset at a given time after sensing microprocessor inactivity, for example, 800 ms. The watchdog test tests for receipt of the reset from the watchdog circuit in a range above and below the expected reset, for example, from 700 ms to 900 ms. If the rest occurs within the set range, the microprocessor is reset and the start up message is provided in block 1202. If the reset is provided outside of the preset range, but before a set time out period, the system reverts to block 1212 nonetheless, but logs an out of tolerance watchdog reset. If no reset is supplied by the watchdog circuit before the time out period, the system reverts to block 1214. The time out period may be set to, for example, one second.

Typically the watchdog circuit is provided to test the microprocessor and to ensure that the microprocessor may be reset if it enters an endless loop. However, in accordance with the invention, the watchdog circuit itself is also tested.

Figure 13:
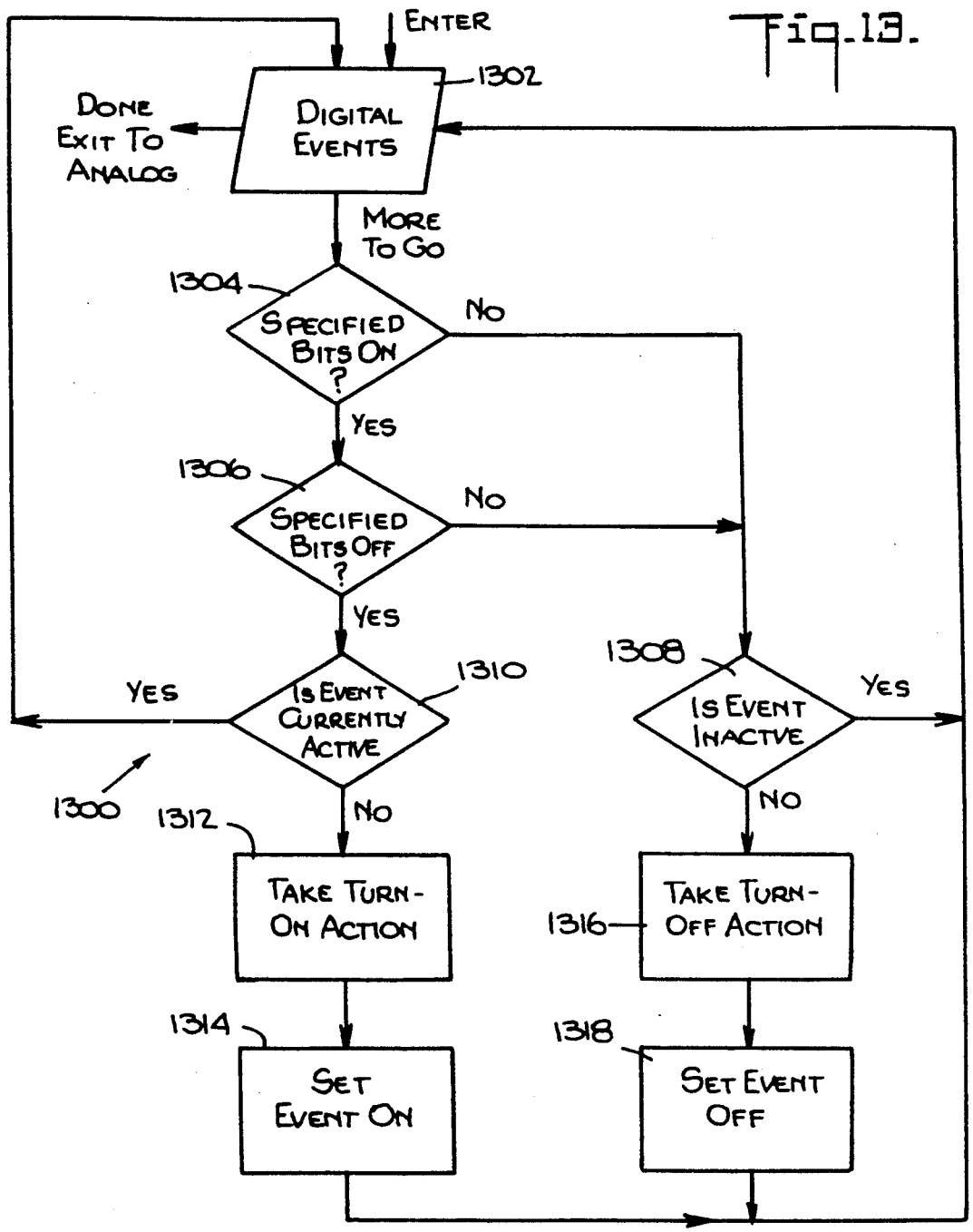
FIG. 13 is a flow chart of the digital event action sub-routine of the main operating loop charted in FIG. 12.

Referring now to FIG. 13, the digital event action subroutine of block 1214 is depicted. In block 1302, the system checks whether all digital events have been tested. If they have, then the system proceeds to the event action analog subroutine in FIG. 14. If they have not, the subroutine proceeds to block 1304 and 1305 where specified bits of the particular digital event in question are tested. Block 1304 determines whether specified bits of the digital event are on and block 1306 tests whether specified bits of the particular event are off. If respective specified bits are not on or not off, the subroutine proceeds to the inactive part of the loop at block 1308. However, ever, if the respective specified bits are one and off, the subroutine enters the active portion of the loop at block 1310. Block 1310 determines whether the particular event was previously active, i.e., whether there has been no change in the event status since the last time it was tested. If the event continues to be active, then no action is taken and the subroutine reverts to block 1302. However, if the event is newly active, i.e., there has been a transition since the last time the event was tested, the subroutine proceeds to block 1312 where the subroutine for taking action on that event is called. The subroutine may simply be setting a flag or advisory, or taking action such as transferring power from one input source to another or shutting the system down. After the appropriate action has been taken in block 1312, the event is set "on" for comparison during the next testing of that event in block 1310. In the nonactive part of the subroutine, the subroutine tests in block 1308 whether the event remained inactive or whether it changed to inactive since the last time the event was tested. If the event remained inactive, the subroutine reverts to block 1302. If the event is newly inactive, the subroutine proceeds to block 1316 and the appropriate turn off action subroutine is called. Thereafter, "event off" is set in block 1318 and the subroutine reverts to block 1302.

Figure 14:
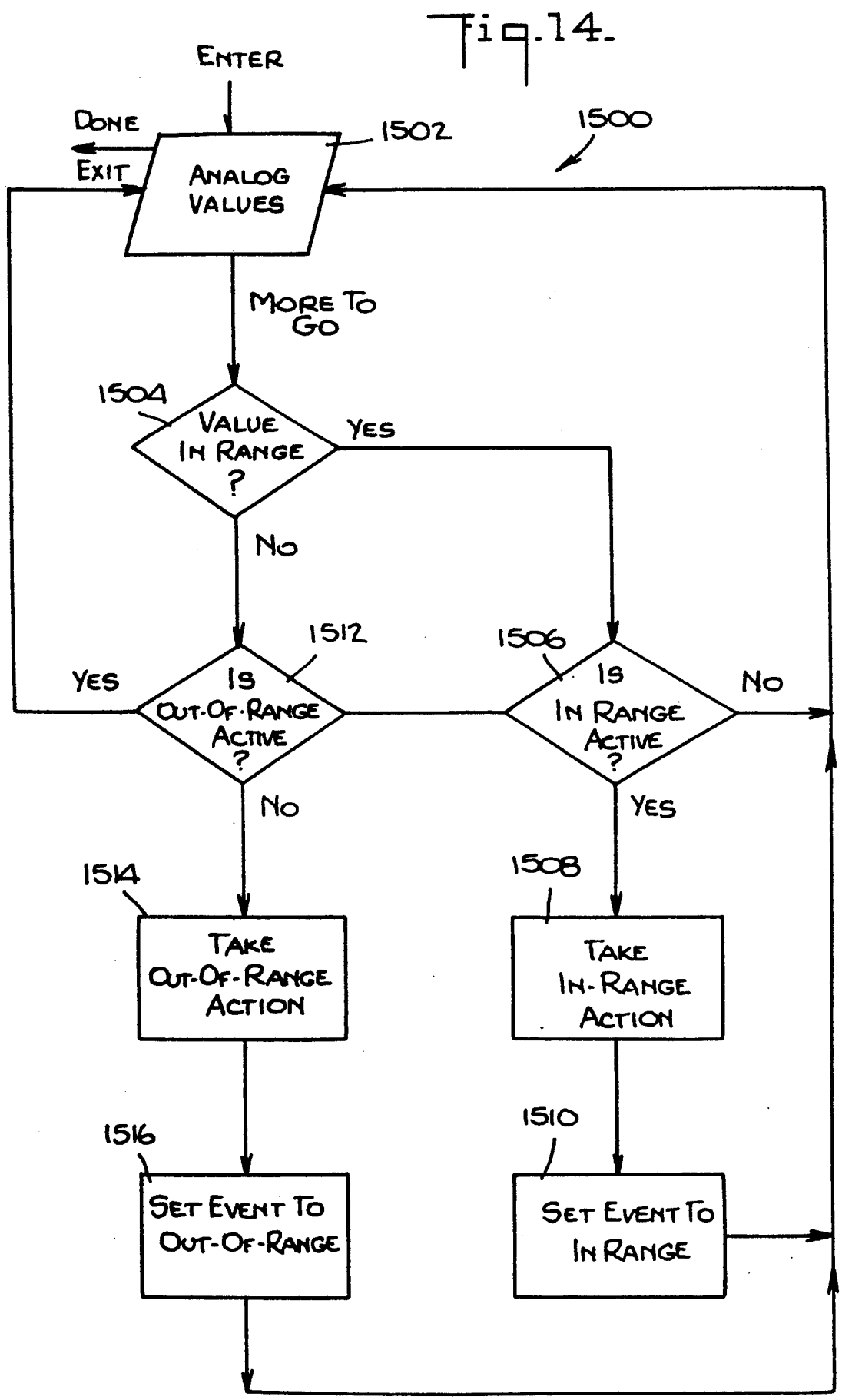
FIG. 14 is a flow chart of the analog event action sub-routine of the main operating loop charted in FIG. 12.

FIG. 14 detects the subroutine for the analog event action. This subroutine is similar to the digital event action subroutine, except that values are tested in ranges rather than for on and off of specified bits. Subroutine 1400 is entered in block 1402. If all of the analog values have been tested, the subroutine is exited and the system reverts to block 1414 of the main operating loop depicted in FIG. 12. If all of the analog values have not been tested, the subroutine proceeds to block 1404. If the analog value is within range, the subroutine proceeds to block 1406 to determine whether the in range condition is active or not, i.e., has changed since the last time it was tested. If the in range condition is not active the subroutine reverts to block 1402. If the in range condition is active, then the subroutine proceeds to block 1408 where another subroutine is called to carry out appropriate action, as generally described for the digital event action. Block 1410 sets the event to "in" range and the system reverts to block 1402. If in block 1404 the tested value is not in range, the subroutine proceeds to block 1412 to determine whether the out of range condition is active. If not active, the subroutine reverts to block 1402. If active, the subroutine calls the particulator take action subroutine in block 1414 and thereafter sets event "out of range" in block 1416 and reverts to block 1402.

FIG. 15 is a flow chart illustrating operation of the initial system power subroutine. In box 1502, upon power up, all circuits and control bits are initialized. In box 1504, the turn on sequence is begun. That sequence causes the system to ignore low voltage indications and to override fault conditions while the system is powering up. PWM circuit 224 in the AC loop receives the ENPWM enable signal from the microprocessor. A soft start feature brings the supply up gradually. After a wait period in block 1506, for example 0.4 seconds, the system proceeds to test the line regulator voltage at VLNRG (A24). That voltage (DCVH) from the power factor corrector and line regulating circuit 80 indicates whether the line voltage is low and whether there is regulation. That voltage is compared to a reference voltage, for example 7.5 volts, in block 1508. If the voltage is less than the 7.5 reference voltage, an advisory is issued by the microprocessor in block 1510, which may be made available to the front panel of the system or to a host. After issuing the advisory, the system proceeds to decision block 1512 where the external DC (NXDC) is tested. If external DC is present, i.e., NXDC is low, that indicates the presence of a suitable external DC source and the system proceeds to block 1514. If the external DC source is not present or is below a predetermined value, the system proceeds to block 1516, and the system does not power up regardless of the status of the internal batteries. The internal batteries are meant to power the system for short periods of time, and the system will not power up to run from internal batteries. The system however remains active in that the internal batteries power the microprocessor and other circuits for communication purposes. If the line voltage is suitable (VLNRG is high) (block 1508), then the system also proceeds to block 1514. In that block, the microprocessor sets ENPWM2 high to enable PWM circuit 502 in the DC loop. Thereafter, the system waits in block 1018 for a fixed time period, for example, 1 second, to allow the system to stabilize. In decision block 1520, the system tests the main DC output voltage ($+5V-1$). If it is out of tolerance, the system in block 1522 sets ENPWM2 low and ENPWM1 low, to thereby inhibit PWM circuits 224 and 502 in the AC and DC loops to start shut down. The system continues shut down and provides a regulation fault error in block 1524. If the main 5 volt output ($+5V-1$) is in tolerance, then APONLO sets a latch having as its output APON, which maintains the power supply on. The system then proceeds in its main operating loop of FIG. 12 into block 1208.

There are a number of events that can be detected by the microcomputer. For example, the occurrence of a line transient or the incorrect functioning of the watchdog circuit. For each event that the microcomputer can detect, there is an Event Control Byte located in the Event Control Table (TABLE V) The Event Control Byte determines the basic actions that the power supply system takes in response to a particular event.

Event Control Byte bit definitions:

BIT.NO 0,1—Severity level (levels 2 & 3 will inhibit startup);

--- binary 0 = no action
1 = require override at start-up
2 = start shutdown imminent timer
3 = shutdown immediately

---

2—Set the System Fault status output (ALOUT5)
3,4—BELL/PWRLED beep/flash speed;

```
binary 0 = normal (No BELL, steady PWRLED)
       1 = .5 Hz, 50% duty cycle
       2 = 1 Hz 25% duty cycle
       3 = 4 Hz, 25% duty cycle
```

5—Report (to rs232 port) when event becomes active
6—Report (to rs232 port) when event becomes inactive
7—Put entry for this event in the Log Buffer.

The current state of each event is stored in a bit pair in an Event Status Table (not shown). The bit pairs are stored in bytes s that each byte in this table holds the status of four events. The bit pair records whether the event has just occurred, whether it has just gone away, or whether it is a steady condition.

The Event Control Bytes inform the system what action, if any, is to be taken with respect to the event identified in the event control table (Table V) when there is and event change, as described below.

Event state bit definitions:

BIT. NO.

0—Event is active
1—Event is in transition to the state determine by bit 0, which yield the following event states:
0—Event is inactive, and has been so for more than 1 scan
1—Event is active, and had been so for more than 1 scan
2—Event has just moved from active to inactive (this scan)
3—Event has just moved from inactive to active (this scan)

The Event Control Byte also contains two report bits (bit Nos. 5 & 6) that indicate whether or not an event should generate an event message when the event occurs, when it goes away, both when it occurs and when it goes away, or never. The Event Control Byte may also refer to special coding.

The results of the tests for the specified bits and analog values referred to in the flow charts of FIGS. 13 and 14 are arranged in a table or matrix. Each time that there is an event change, which the system detects as status change in the event state bits, the system compares the results in the table or matrix to the Event Control Bytes. When there is a match, the system takes the action specified in the control byte or special coding referred to in the Event Control Bytes.

If the REPORTS parameter located in the Parameter Table is set to zero, event reports will be disabled.

The format of the event message is as follows:

| Preamble | Event Id | Event Status | Postamble |

The event message preamble (EPREAMB) and the message postamble (POSTAMB) are defined in the Parameter Table (Table IV).

The Event Id is an unique number assigned to each event as specified in the Event Control Table (Table V).

The Event Status is the two bit status value associated with the event as found in the Event Status Table (not shown) and will be either two (event is inactive) or three (event is active).

The Event Control Byte also contains a log bit (bit No. 7) that indicates whether or not the event should be logged in the Log Buffer. If the log bit is set, the event is logged when it becomes active. The parameter LOGBUF determines how many events are logged before a log message is transmitted. If LOGBUF is zero, log messages are disabled.

The format of the log message is as follows:

| Preamble | Id #1, Id #2, ... Id (LOGBUF) | Postamble |

The log message preamble (LPREAMB) and the message postamble (POSTAMB) are defined in the Parameter Table.

Between the preamble and postamble is a list of the event id codes that have been saved in the log buffer. The number of codes transmitted in the log message is equivalent to the count stored in the parameter LOGBUF.

Status Indicators

PGOOD—indicates that power is good. Configurable to occur after any power group has been enabled.

PWRLED—indicates (when on steady) normal supply operation. When flashing at 1 Hz, 50% duty cycle indicates minor problem, when flashing at 4 Hz, 50% duty cycle indicates more severe problem.

BELL—Indicates fault conditions together with PWRLED

ALOUT1—indicates loss of A.C. power
ALOUT2—indicates loss of D.C. power
ALOUT3—indicates normal operation (stable primary power)
ALOUT4—indicates an imminent system shutdown
ALOUT5—indicates a fault has occurred Certain changes and modifications of the embodiments of the invention disclosed herein will be readily apparent to those skilled in the art. It is intended to cover by the claims all those changes and modifications which may be made to the embodiments disclosed herein without departing from the spirit and scope of the invention.

TABLE I

STATUS BITS

| SIGNAL NAME | ACTIVE STATE |
|---|---|
| (S01) TRD = Transient detected. | HI |
| (S02) LOLI = Low-line detected | HI |
| (S03) NXDC = No external D.C. present | HI |
| (S04) OCIND = Overcharge indicator. | HI |
| (S05) OCTRM = Overcharge terminated. | HI |
| (S06) SSAC = Supply source is now A.C. | HI |
| (S07) SSDC = Supply source is now D.C. | HI |
| (S08) SSBAT = Supply source is now internal batteries. | HI |

After power on:
(OCIND*) and (OCTRM*) = BULKCHARGE, constant current.
(OCIND) and (OCTRM*) = OVERCHARGE, verifies full charge.
(OCIND) and (OCTRM) = FLOATCHARGE, replaces losses due to self-discharge
LOLI is latched until reset by RTACL.
TRD is latched until reset by RD*.
NXDC is latched until reset by ENXDC.
SSAC, SSDC, and SSBAT From FF's in load transfer logic.

TABLE II

| SIGNAL NAME | CONTROL BITS ACTIVE STATE | INITIAL STATE |
|---|---|---|
| (C01) INCHG = Inhibit charger. | HI | HI |
| (C02) IN5-2 = Inhibit 5 volt #2. | HI | HI |
| (C03) IN5-3 | HI | HI |
| (C04) IN5-4 | HI | HI |
| (C05) IN12-1 = Inhibit 12 volt #1. | HI | HI |
| (C06) IN12-2 | HI | HI |
| (C07) IN12-3 | HI | HI |
| (C08) IN12-4 | HI | HI |
| (C09) FS0 = Fan speed bit 0. | HI | LO |
| (C10) FS1 | HI | LO |
| (C11) FS2 | HI | LO |
| (C12) FS3 | HI | LO |
| (C13) FNEN = Fan enable. | HI | LO |
| (C14) ENPMW1 = Enable pulse width modulator 1. | HI | LO |
| (C15) ENPWM2 = Enable pulse width modulator 2. | HI | LO |
| (C16) MUXAD0 = Multiplexer address bit 0. | HI | LO |
| (C17) MUXAD1 | HI | LO |
| (C18) MUXAD2 | HI | LO |
| (C19) MUXSEL0* = Multiplexer select line. | LO | HI |
| (C20) MUXSEL1* | LO | HI |
| (C21) MUXSEL2* | LO | HI |
| (C22) RTACL = Return to A.C. line. | PULSED LO | HI |
| (C23) ENXDC = Enable external D.C. operation. | PULSED LO | HI |
| (C24) ENIBO = Enable internal batt. operation. | PULSED LO | HI |
| (C25) APON = Analog Power on. | HI | LO |
| (C26) LOLIOVR = Low line overide. | HI | LO |

TABLE III

ANALOG CHANNEL DEFINITIONS (A01) +5V-1 = +5 volt output #1; (from motherboard sense lines).
(A02) +5V-2 = +5 volt output #2
(A03) +5V-3 = +5 volt output #3
(A04) +5V-4 = +5 volt output #4 (0 volts to +8 volts).
(A05) −5V-1 = −5 volt output (0 volts to −8 volts).
(A06) +12V-1 = +12 volt output #1
(A07) +12V-2 = +12 volt output #2
(A07) +12V-3 = +12 volt output #3
(A09) +12V-4 = +12 volt output #4 (0 volts to +16 volts).
(A10) −12V-1 = −12 volt output (0 volts to −16 volts).
(A11) +5I = +5 volt current output (0 amps to 40 amps).
(A12) −5I = −5 volt current output (0 amps to 2 amps).
(A13) +14I = +14 volt current output (0 amps to 8 amps).
(A14) −12I = −12 volt current output (0 to 2 amps).
(A15) Fan Current (0 amps to 2 amp).
(A16) BAT1 = Battery #1 terminal voltage. (0 to 8 volts).
(A17) BAT2 = Battery #2 terminal voltage.
(A18) BAT3 = Battery #3 terminal voltage.
(A19) BAT4 = Battery #4 terminal voltage.
(A20) BAT5 = Battery #5 terminal voltage.
(A21) TMPSS = Temp. sensor #1 = hot-spot temp. (0 to +150 deg. C).
(A22) TMPEX = Temp. sensor #2 = exhaust air temp.
(A23) TMPAM = Temp. sensor #3 = intake air temp.
(A24) VLRG = Line regulator voltage.

All analog signals are normalized to the ADC input dynamic range of 0 volts to +4 volts. (4.095 volt = 4095 binary).

TABLE IV

PARAMETER TABLE

| Offset | Name | Description | Options | Default |
|---|---|---|---|---|
| | BAUD | RS232 baud rate | 300–9600 | 300 |
| | COMOPT | RS2232 setup options | | |
| | PGGRP | Power group after which PGOOD becomes true | 1–4* | 4 |
| | P2DLY | Power up delay from group 1 to 2 | 0–254 seconds or auto (255) | 0 |
| | P3DLY | Power up delay from group 2 to 3 | 0–254 seconds or auto (255) | 0 |
| | P4DLY | Power up delay from group 3 to 4 | 0–254 seconds or auto (255) | 0 |
| | RTNDLY | Amount of time primary power must be stable before "returning to normal" (primary power) | 0–255 seconds | 30 |
| | SHUTDLBY | Shutdown delay (from shutdown imminent condition) | 0–255 seconds | 60 |
| | OPTEMP | Optimum operating temperature | 25°–60° C. | 40 |
| | AMBSP | Ambient set point | 25°–60° C. or 0 = no adjust | 0 |
| | AMBADJ | Ambient adjustment | Deg per 10° chg in ambient | 0 |
| | MAXTEMP | Shutdown temperature | 25°–255° | 80 |
| | MINBAT | Minimum battery leavel | 0–100% | 30 |
| | ALMTO | Fault alarm timeout | 0–254 seconds or never (255) | 255 |
| | EPRELEN | Event preamble length | 0–2 | 1 |
| | EPREAMB | Event preamble string | up to 2 hex chrs | 3A |
| | LPRELEN | Log data preamble length | 0–2 | 1 |
| | LPREAMB | Log data preamble string | up to 2 hex chrs | 3B |

TABLE IV-continued

PARAMETER TABLE

| Offset | Name | Description | Options | Default |
|--------|------|-------------|---------|---------|
| | RPRELEN | Response preamble length | 0-2 | 1 |
| | RPREAMB | Response preamble string | up to 2 hex chrs | 3C |
| | POSTLEN | Message postamble length | 0-2 | 2 |
| | POSTAMB | Message postamble string | up to 2 hex chrs | OD OA |
| | REPORTS | Switch to turn on/off event reporting | 0 = off, 1 = on | 0 |
| | LOGBUF | Number of events to log before transmissions (0 = no log reports) | 0-32 | 0 |

*1 = logic power only;
2 = after second group;
3 = after third group;
4 = after fourth group.

TABLE V

Event Control Table

| Offset | ID | Description |
|--------|----|-------------|
| | 01 | The Power is off, no primary power exists, and the battery is not at full charge |
| | 02 | The battery is not delivering rated capacity |
| | 03 | The battery is not at full charge |
| | 04 | The battery cannot sustain one power loss/shutdown cycle |
| | 05 | Battery charge problem: CFM to COM, or COM to CBM transistion occurred while SSBAT was false |
| | 06 | Microcontroller was unexpectedly reset |
| | 07 | Watchdog failure - reset too early |
| | 08 | Watchdog failure - reset too late |
| | 09 | Watchdog failure - reset not detected within test period |
| | 10 | +5V#1 above maximum or over-range detected |
| | 11 | +5V#1 below minimum or incorrect polarity detected |
| | 12 | +5V#2 above maximum or over-range detected |
| | 13 | +5V#2 below minimum or incorrect polarity detected |
| | 14 | +5V#3 above maximum or over-range detected |
| | 15 | +5V#3 below minimum or incorrect polarity detected |
| | 16 | +5V#4 above maximum or over-range detected |
| | 17 | +5V#4 below minimum or incorrect polarity detected |
| | 18 | +12V#1 above maximum or over-range detected |
| | 19 | +12V#1 below minimum or incorrect polarity detected |
| | 20 | +12V#2 above maximum or over-range detected |
| | 21 | +12V#2 below minimum or incorrect polarity detected |
| | 22 | +12V#3 above maximum or over-range detected |
| | 23 | +12V#3 below minimum or incorrect polarity detected |
| | 24 | +12V#4 above maximum or over-range detected |
| | 25 | +12V#4 below minimum or incorrect polarity detected |
| | 26 | −5V above maximum or over-range detected |
| | 27 | −5V below minimum or incorrect polarity detected |
| | 28 | −12V above maximum or over-range detected |
| | 29 | −12V below minimum or incorrect polarity detected |
| | 30 | B1TV above maximum or over-range detected |
| | 31 | B1TV below minimum or incorrect polarity detected |
| | 32 | B2TV above maximum or over-range detected |
| | 33 | B2TV below minimum or incorrect polarity detected |
| | 34 | B3TV above maximum or over-range detected |
| | 35 | B3TV below minimum or incorrect polarity detected |
| | 36 | B4TV above maximum or over-range detected |
| | 37 | B4TV below minimum or incorrect polarity detected |
| | 38 | +5I above maximum or over-range detected |
| | 39 | +5I below minimum or incorrect polarity detected |
| | 40 | −5I above maximum or over-range detected |
| | 41 | −5I below minimum or incorrect polarity detected |
| | 42 | +14I above maximum or over-range detected |
| | 43 | +14I below minimum or incorrect polarity detected |
| | 44 | −12I above maximum or over-range detected |
| | 45 | −12I below minimum or incorrect polarity detected |
| | 46 | FI (fan current) above maximum or over-range detected |
| | 47 | FI (fan current) below minimum or incorrect polarity detected |
| | 48 | Fan Tachometer above maximum or over-range detected |
| | 49 | Fan Tachometer below minimum or incorrect polarity detected |
| | 50 | Maximum operating temperature exceeded |
| | 51 | TMPPS (power supply temp) over-range detected |
| | 52 | TMPPS (power supply temp) incorrect polarity detected |
| | 53 | TMPEX (exhaust temp) over-range detected |
| | 54 | TMPEX (exhaust temp) incorrect polarity detected |
| | 55 | TMPAM (ambient temp) over-range detected |
| | 56 | TMPAM (ambient temp) incorrect polarity detected |
| | 57 | SSAC (supply source now A.C.) is active |

TABLE V-continued

Event Control Table

| Offset | ID | Description |
|---|---|---|
| | 58 | SSAC (supply source now A.C.) is inactive |
| | 59 | SSDC (supply source now D.C.) is active |
| | 60 | SSDC (supply source now D.C.) is inactive |
| | 61 | SSBAT (supply source now Battery) is active |
| | 62 | SSBAT (supply source now Battery) is inactive |
| | 63 | TRD (A.C. line transient) has been detected |
| | 64 | LOLI (A.C. loss) detected |
| | 65 | NXDC (No external D.C. present) is active |
| | 66 | NXDC (No external D.C. present) is inactive |
| | 67 | CBM (Charger bulk mode) is active |
| | 68 | CBM (Charger bulk mode) is inactive |
| | 69 | COM (Charger Over-charge mode) is active |
| | 70 | COM (Charger Over-charge mode) is active |
| | 71 | CFM (Charger float mode) is active |
| | 72 | CFM (Charger float mode) is active |
| | 73 | PWRON (Panel power toggle request) is active |
| | 74 | FOVR (Panel fault override) is active |
| | 75 | PRST (Panel reset request) is active |
| | 76 | ALACK (Panel Alarm Acknowledge) is active |
| | 77 | ACAL (Auto calibration load) is installed |
| | 78 | Change in A.C. or D.C. line status since power up |
| | 79 | Power supply has switched power source |

We claim:

1. A power supply system for receiving at least an AC power signal and a DC power signal and therefrom supplying power to apparatus for sustaining normal operation of said apparatus, comprising:

means for rectifying said AC power signal, when it is supplied to said system, and providing a rectified signal;

first regulating means for regulating said rectified signal and providing a first regulated DC signal;

second regulating means for regulating a DC signal and providing a second regulated DC signal;

control means for causing one signal of said DC power signal and said first regulated DC signal, when both said DC power signal and said AC power signal are supplied and one of them when only one of them is supplied, to be coupled to said second regulating means; said control means being settable to cause a preselected one of said DC power signal and said first regulated DC signal to be coupled to said second regulating means when both said DC power signal and said AC power signal are supplied.

2. The power supply system of claim 1 wherein said control means comprises a programmable computer.

3. The power supply system of claim 2 including a DC battery providing a DC battery signal, wherein said control means causes said DC battery signal to be coupled to said second regulating means when said AC power signal and said DC power signal are not supplied.

4. The power supply system of claim 1 wherein said control means automatically causes the other signal of said DC power signal and said first regulated DC signal to be coupled to said second regulating means in place of said one signal when said one signal is not within prescribed limits.

5. The power supply system of claim 4 wherein said control means automatically causes said one signal to again be coupled to said second regulating means in place of said other signal when said one signal is again within prescribed limits.

6. The power supply system of claim 4 wherein said second regulating means includes a switch mode regulator having a switching frequency and said control means includes circuitry coupled to a clock which clocks a change in coupling between said one and said other signal to said second regulating means, said clock having a frequency substantially higher than said switching frequency of said switch mode regulator of said second regulating means, said control means causing said change in coupling between said one signal and said other signal to occur within a same cycle of said switching frequency.

7. The power supply system of claim 1 wherein said power supply is constructed to receive and operate from an AC power signal of from about 85 volts to about 260 volts in the frequency range of about 40 Hz to about 440 Hz.

8. The power supply system of claim 7 wherein said power supply system is constructed to receive and operate from a DC power signal of from about 22 v DC to about 32 v DC.

9. The power supply system of claim 1 wherein said first regulating means and said second regulating means each include a switch mode regulator.

10. A power supply system for receiving at least an AC power signal and a DC power signal and therefrom supplying power to apparatus for sustaining normal operation of said apparatus, and for receiving a battery DC signal, comprising:

means for rectifying said AC power signal, when it is supplied to said system, and providing a rectified signal;

first regulating means for regulating said rectified signal and providing a first regulated DC signal;

second regulating mans for regulating a DC signal and providing a second regulated DC signal;

a battery providing said battery DC signal;

control means for causing one signal of said first regulated DC signal, said DC power signal and said battery DC signal when at least two of them are supplied, and one of them when only one of them is supplied, to be coupled to said second regulating means; said control means being settable to cause said one signal to be coupled to said second regulating means in a predetermined priority sequence.

11. The power supply system of claim 10 wherein said control means comprises a programmable computer.

12. The power supply system of claim 10 wherein said control means automatically causes termination of coupling of said one signal to said second regulating means when said one signal is not within prescribed limits and causes coupling of another signal of said first regulated DC signal, said DC power signal and said battery DC signal in accordance with said priority sequence.

13. The power supply system of claim 12 wherein said control means automatically causes said one signal to again be coupled to said second regulating means when said one signal is again within prescribed limits.

14. The power supply system of claim 12 wherein said second regulating means includes a switch mode regulator having a switching frequency and said control means includes circuitry coupled to a clock which clocks a change in coupling between said one signal and said another signal to said second regulating means, said clock having a frequency substantially higher than said switching frequency of said switch mode regulator of said second regulating means, said control means causing said change in coupling between said one signal and said another signal to occur within the same cycle of said switching frequency.

15. A power supply system comprising:
regulating means for regulating a power input signal and providing a regulated DC output signal;
a battery providing a DC input signal;
control means for causing said power input signal when supplied and said Dc input signal when said power input signal is not supplied to be coupled to said regulating means;
means coupled to said battery for determining the condition of said battery;
said control means including means for determining, when said DC input signal is coupled to said regulating means, the length of time said system may safely operate from said battery.

16. The power supply system of claim 15 wherein said control means comprises a programmable computer.

17. The power supply system of claim 15 wherein said control means automatically causes termination of coupling said power input signal to said regulating means when said power input signal is not within prescribed limits and causes coupling of said DC input signal to said regulating means.

18. The power supply system of claim 17 wherein said control means automatically causes said power input signal again to be coupled to said regulating means when said power input signal is again within prescribed limits.

19. The power supply system of claim 17 wherein said regulating means includes a switch mode regulator having a switching frequency, said control means including circuitry coupled to a clock which clocks a change in coupling of said power input signal and said DC input signal to said regulating means, said clock having a frequency substantially higher than said switching frequency of said switch mode regulator of said regulating means, said control means causing said change in coupling between said power input signal and said DC input signal to occur within the same cycle of said switching frequency.

20. The power supply system of claim 15 including means for charging said battery from said power input signal.

21. The power supply system of claim 20 wherein said means for determining the condition of said battery determines the condition of said battery from the rate of charging thereof.

22. The power supply system of claim 15 including means for communicating with a host system, said control means including means for supplying said time to said host system.

23. The power supply system of claim 22 including means cooperating with said host system for downloading at least one parameter from said host system to said control means for causing said control means to change operation of said power supply system based on said time.

24. An electronic control system comprising a computer and a watchdog circuit coupled thereto to monitor operation of said computer and reset said computer when said watchdog circuit detects a fault therein, said watchdog circuit and said computer including means to periodically self test operation of said watchdog circuit.

25. A computer-controlled power supply system including a local computer for controlling operation of said power supply system, means programmable in said local computer for causing said local computer to control operation of said power supply system based on a plurality of parameters, a communication channel for communicating with a host system, and means cooperating with said host system for downloading from said host system at least one of said parameters.

26. A power supply system comprising a regulator receiving a power input and providing at least three regulated DC outputs, means for monitoring at least one power supply parameter during turn on of said power supply system, and means for sequentially activating said outputs in response to said monitoring means when said power supply system is turned on or reset.

27. A power supply system comprising a regulator and means for determining the current drawn by at least one load coupled to said regulator, said current determining means including a current sense resistance, said resistance being a trace on a circuit board, said system including means for calibrating said sense resistance.

28. A power supply system comprising regulating means for receiving at least one power input and providing at least one regulated power output, means coupling said at least one power output to a plurality of loads, control means for controlling said coupling means to selectively supply said regulated power output to said loads, and monitoring means for monitoring at least one power supply system parameter, said control means causing said coupling means to selectively disconnect said loads from said regulated power output in response to said monitoring means in at least one predetermined sequence determined by said control means.

29. The power supply system of claim 28 wherein said control means is a computer.

30. The power supply system of claim 29 wherein said computer includes memory means for storing said at least one predetermined sequence.

31. The power supply system of claim 30 including communication means for communicating with said computer for at least altering the predetermined sequence stored in said memory means.

32. The power supply system of claim 28 wherein said power supply system receives a plurality of power input signals and said control means selects one of said plurality of power input signals to be coupled to regulating means according to a predetermined priority sequence, said power supply system including means for coupling a selected one of said power input signals to said regulating means, said control means causing said power signal coupling means to couple said selected one of said power input signals to said regulating means.

33. A power supply system for receiving at least one power input signal and providing at least one regulated power output, comprising a switch mode regulator which receives said at least one power input signal and provides said at least one power output, monitoring means for monitoring operation of said switch mode regulator and said at least one power input signal, and control means for controlling operation of said switch mode regulator, said control means, upon turning on or resetting of said power supply system, and before said regulating means provides said at least one power output, controlling whether said switch mode regulator provides said power output or not in dependence upon said monitoring means.

34. A power supply system for receiving at least one power input signal and providing at least one regulated power output and for powering at least one fan, comprising first means for monitoring the temperature at a first location relative to said fan and providing a first signal relating to said temperature at said first location, second means for monitoring the temperature at a second location relative to said fan and providing a second signal relating to said temperature at said second location, and control means for controlling said fan or operation of said power supply system, or both, in response to said first and second signals and the configuration of said control means.

35. A power supply system for receiving at least one power input and providing therefrom a plurality of power outputs, comprising means for providing said plurality of power outputs from said at least one power input, means for coupling said plurality of power outputs to respective loads, control means for controlling said coupling means for selectively coupling respective outputs to respective loads and monitoring means for monitoring at least one power supply parameter, said control means causing said coupling means to selectively couple power outputs to respective loads in accordance with said at least one monitored power supply parameter and the configuration of said control means.

36. The power supply system of claim 35 wherein said control means is configured to control said coupling means during turn-on after resetting of said system to cause said coupling means to selectively couple power outputs to respective loads during system turn-on or after resetting.

37. The power supply system of claim 35 wherein said control means is configured to control said coupling means during operation of said system to cause said coupling means to selectively disconnect power outputs from respective loads.

38. The power supply system of claim 35 wherein said control means comprises memory means which establish at least in part said configuration of said control means, and processing means cooperating with said memory means for controlling said coupling means.

39. The power supply system of claim 38 including means for communicating with a host system and means for altering said memory means in response to said host system to change the configuration of said control means.

40. A power supply system comprising a computer for controlling operation of said power supply system, means programmable in said computer for causing said computer to control operation of said power supply system based on a plurality of parameters, means for monitoring said plurality of parameters, and under control of said computer, providing information relating to said parameters to said computer, a communication channel for communicating with a host system, means cooperating with said host system for providing said information from said computer to said host system, and means cooperating with said host system for downloading at least one parameter from said host system to said computer for causing said computer to change operation of said power supply system.

* * * * *